United States Patent
Gurelli et al.

(10) Patent No.: US 11,595,106 B1
(45) Date of Patent: Feb. 28, 2023

(54) BEAMFORMING BY AN INTELLIGENT REFLECTING SURFACE USING SAMPLING OF SURFACE PHASE AND INTERPOLATION

(71) Applicant: QUALCOMM Incorporated, San Diego, CA (US)

(72) Inventors: Mehmet Izzet Gurelli, San Diego, CA (US); Qiang Wu, San Diego, CA (US); Junyi Li, Fairless Hills, PA (US); Raju Hormis, New York, NY (US); Tao Luo, San Diego, CA (US); Navid Abedini, Basking Ridge, NJ (US); Ozge Koymen, Princeton, NJ (US); Farideddin Fayazbakhsh, Chatham, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/457,975

(22) Filed: Dec. 7, 2021

(51) Int. Cl.
*H04B 7/14* (2006.01)
*H04B 7/06* (2006.01)
*H04B 7/08* (2006.01)

(52) U.S. Cl.
CPC ........... *H04B 7/0695* (2013.01); *H04B 7/066* (2013.01); *H04B 7/084* (2013.01)

(58) Field of Classification Search
CPC ...... H04B 7/0695; H04B 7/066; H04B 7/084; H04B 7/145; H04B 7/0617; H04B 7/043; H04B 7/0456; H04B 7/06; H04B 7/088; H01Q 15/148; H01Q 19/10; H01Q 3/44
See application file for complete search history.

(56) References Cited

U.S. PATENT DOCUMENTS

2022/0216908 A1* 7/2022 Choi ...................... H04B 7/145
2022/0231753 A1* 7/2022 Bengtsson ............. H04B 7/088

FOREIGN PATENT DOCUMENTS

WO WO-2021221603 A1 * 11/2021

* cited by examiner

*Primary Examiner* — David S Huang
(74) *Attorney, Agent, or Firm* — Procopio, Cory, Hargreaves & Savitch

(57) ABSTRACT

A node may activate, in each iteration of a plurality of iterations, a respective segment of a plurality of segments of an IRS of the node. Each iteration of the plurality of iterations may correspond to one segment of the plurality of segments. The apparatus may receive, from the first wireless device, an indication of a second configuration for the node to generate one or more reflected beams toward the first wireless device or the second wireless device. The second configuration may be based on an interpolation process based on a plurality of phases or phase derivatives associated with the plurality of segments. The apparatus may forward, from the first wireless device to the second wireless device or from the second wireless device to the first wireless device, communications via the IRS based on the second configuration and the one or more reflected beams.

30 Claims, 15 Drawing Sheets

BEAMFORMING BY AN INTELLIGENT REFLECTING SURFACE USING SAMPLING OF SURFACE PHASE AND INTERPOLATION

TECHNICAL FIELD

The present disclosure relates generally to communication systems, and more particularly, to identification of a phase configuration for beamforming from an intelligent reflecting surface (IRS) based on sampling and interpolation.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a node. The apparatus may activate, in each iteration of a plurality of iterations, a respective segment of a plurality of segments of an intelligent reflecting surface (IRS) of the node. Each iteration of the plurality of iterations may correspond to one segment of the plurality of segments. The apparatus may forward, from a first wireless device to a second wireless device or from the second wireless device to the first wireless device, in each iteration of the plurality of iterations, one or more respective reference signals of a plurality of reference signals via the respective segment of the plurality of segments of the IRS corresponding to the iteration. The apparatus may receive, from the first wireless device, an indication of a second configuration for the node to generate one or more reflected beams toward the first wireless device or the second wireless device. The apparatus may forward, from the first wireless device to the second wireless device or from the second wireless device to the first wireless device, communications via the IRS based on the second configuration and the one or more reflected beams.

In an aspect of the disclosure, a method, a computer-readable medium, and an apparatus are provided. The apparatus may be a first wireless device. The apparatus may transmit, to a node, in each iteration of a plurality of iterations, an indication of a first configuration for the node associated with activating a respective segment of a plurality of segments of an IRS of the node. Each iteration of the plurality of iterations may correspond to one segment of the plurality of segments. The apparatus may identify, in each iteration of the plurality of iterations, one or more respective phases or phase derivatives of a plurality of phases or phase derivatives based on one or more respective reference signals of a plurality of reference signals. The one or more respective phases or phase derivatives may be associated with the respective segment. The plurality of phases or phase derivatives may be associated with the plurality of segments. The apparatus may identify a second configuration for the node associated with generating one or more reflected beams from the IRS of the node toward the first wireless device or a second wireless device. The apparatus may communicate with the second wireless device via the node based on the second configuration and the one or more reflected beams.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
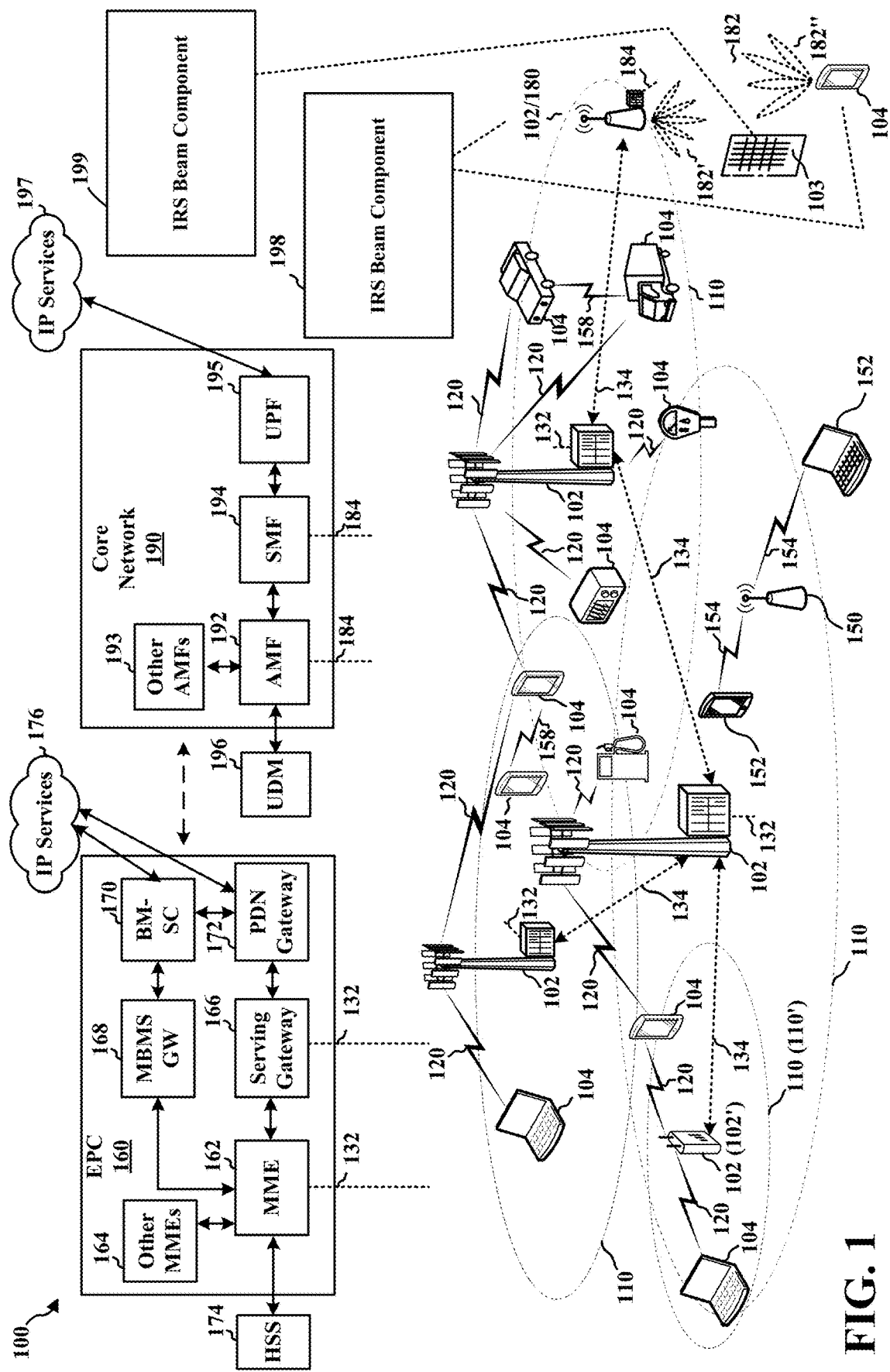
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the node 103 may include an IRS beam component 199 that may be configured to activate, in each iteration of a plurality of iterations, a respective segment of a plurality of segments of an intelligent reflecting surface (IRS) of the node. Each iteration of the plurality of iterations may correspond to one segment of the plurality of segments. The IRS beam component 199 may be configured to forward, from a first wireless device to a second wireless device or from the second wireless device to the first wireless device, in each iteration of the plurality of iterations, one or more respective reference signals of a plurality of reference signals via the respective segment of the plurality of segments of the IRS corresponding to the iteration. The IRS beam component 199 may be configured to receive, from the first wireless device, an indication of a second configuration for the node to generate one or more reflected beams toward the first wireless device or the second wireless device. The IRS beam component 199 may be configured to forward, from the first wireless device to the second wireless device or from the second wireless device to the first wireless device, communications via the IRS based on the second configuration and the one or more reflected beams.

In certain aspects, the first wireless device 102/180/104 may include an IRS beam component 198 that may be configured to transmit, to a node, in each iteration of a plurality of iterations, an indication of a first configuration for the node associated with activating a respective segment of a plurality of segments of an IRS of the node. Each iteration of the plurality of iterations may correspond to one segment of the plurality of segments. The IRS beam component 198 may be configured to identify, in each iteration of the plurality of iterations, one or more respective phases or phase derivatives of a plurality of phases or phase derivatives based on one or more respective reference signals of a plurality of reference signals. The one or more respective phases or phase derivatives may be associated with the respective segment. The plurality of phases or phase derivatives may be associated with the plurality of segments. The IRS beam component 198 may be configured to identify a second configuration for the node associated with generating one or more reflected beams from the IRS of the node toward the first wireless device or a second wireless device. The IRS beam component 198 may be configured to communicate with the second wireless device via the node based on the second configuration and the one or more reflected beams. Although the following description may be focused on 5G NR, the concepts described herein may be applicable to other similar areas, such as LTE, LTE-A, CDMA, GSM, and other wireless technologies.

Figure 2:
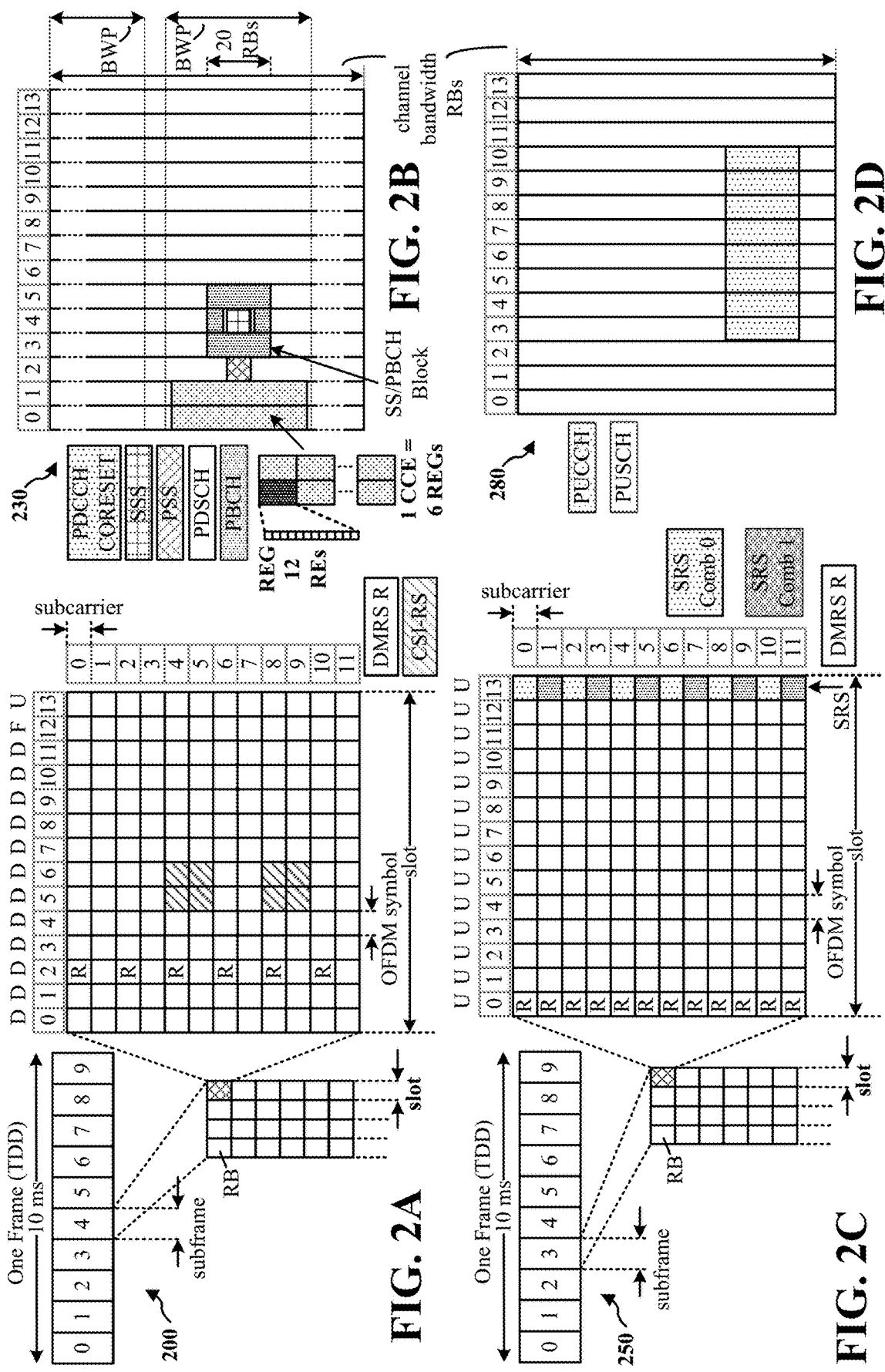
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
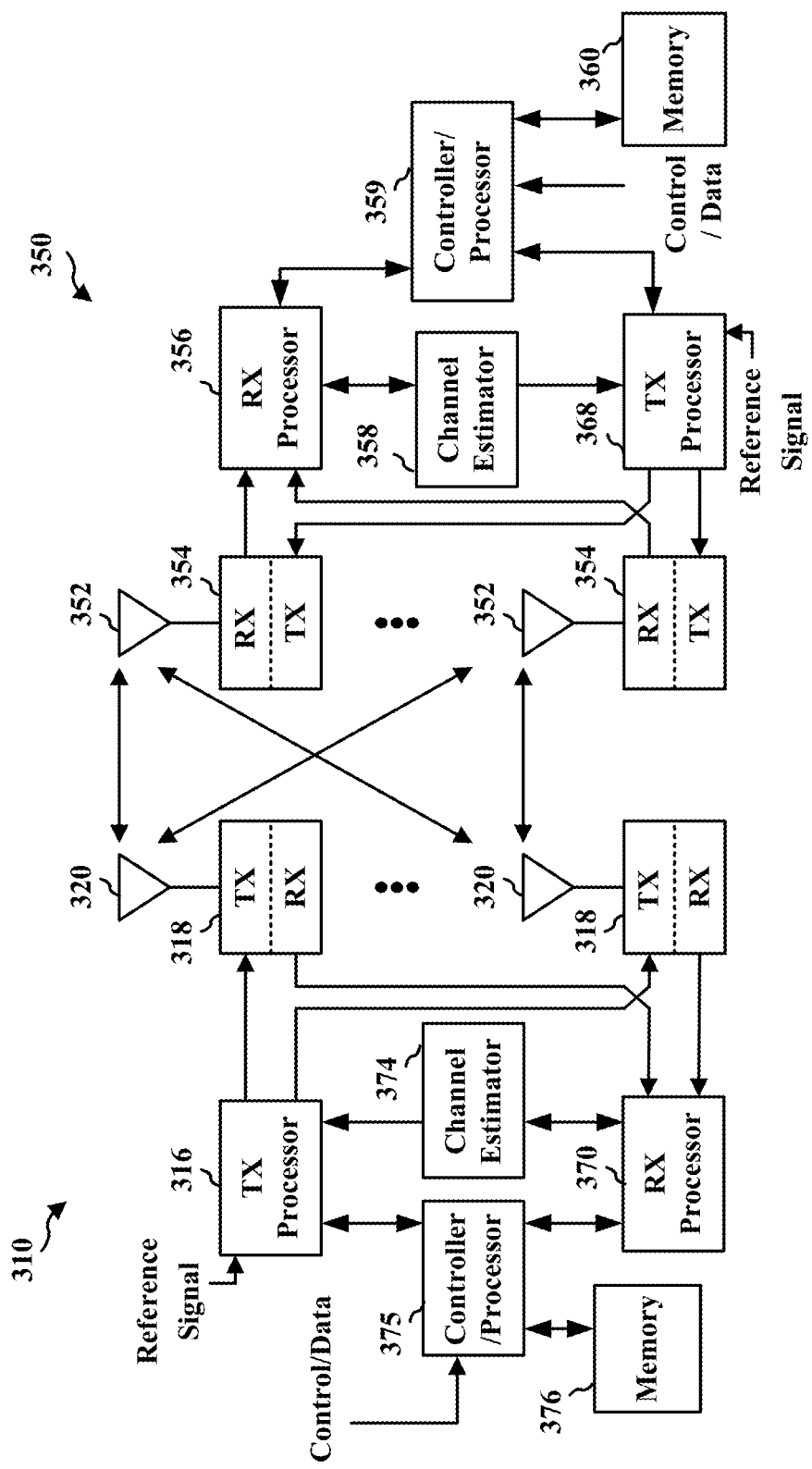
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 199 of FIG. 1.

Figure 4:
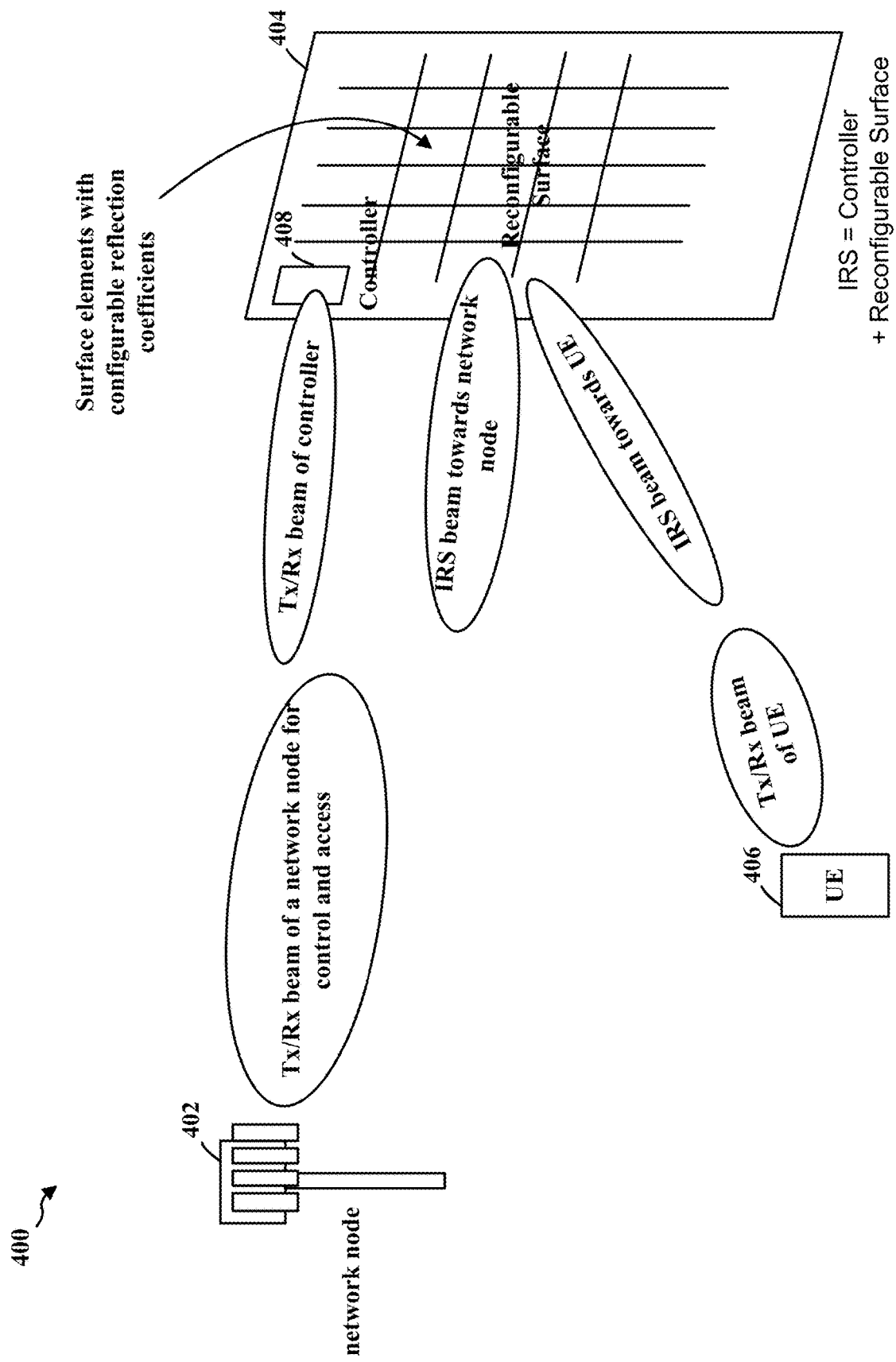
FIG. 4 is a diagram illustrating an environment in which aspects described herein may be practiced.

FIG. 4 is a diagram 400 illustrating an environment in which aspects described herein may be practiced. An IRS 404 may include a surface with densely packed small surface elements. Each surface element may have a controllable reflection coefficient. By adjusting the reflection coefficient, the phase shift between the incident and reflected rays to and from the surface element, respectively, may be controlled. The IRS 404 may be controlled by the controller 408, which may be configured based on an IRS configuration message received from the network node 402. Depending on the implementation, various forms of non-ideal effects may take place. For example, the phase shift may have a limited range, or there may be a gain variation that depends on the phase shift. Depending on the implementation, the surface elements may also be referred to as metaatoms.

When the surface phase (e.g., the phases of the surface elements) is properly set, the beam from the network node 402 may be reflected by the IRS 404 toward the UE 406 in the downlink. Conversely, the beam from the UE 406 may be reflected by the IRS 404 toward the network node 402 in the uplink. Accordingly, the IRS 404 may help to reduce the pathloss and avoid blockages in the line-of-sight (LOS) propagation. The network node 402 may be any of a base station, a remote radio head (RRH), a repeater, etc. Although herein aspects may be described in relation to 5G and millimeter wave (mmW) bands, the aspects may be equally applicable to other technologies such as 4G LTE, IEEE 802.11 WIFI, or future generations of technologies including beyond 5G, 6G, etc., and to other bands such as the sub-6 GHz bands, terahertz bands, etc.

One or more aspects may relate to techniques for creating a focused reflection of the beam from the base station by an IRS towards a UE. The techniques described herein may also be used for beamforming from an IRS towards a base station (i.e., for the uplink).

In one or more configurations, the phase of the received signal from each segment in a set of segments within the IRS may be measured.

Figure 5:
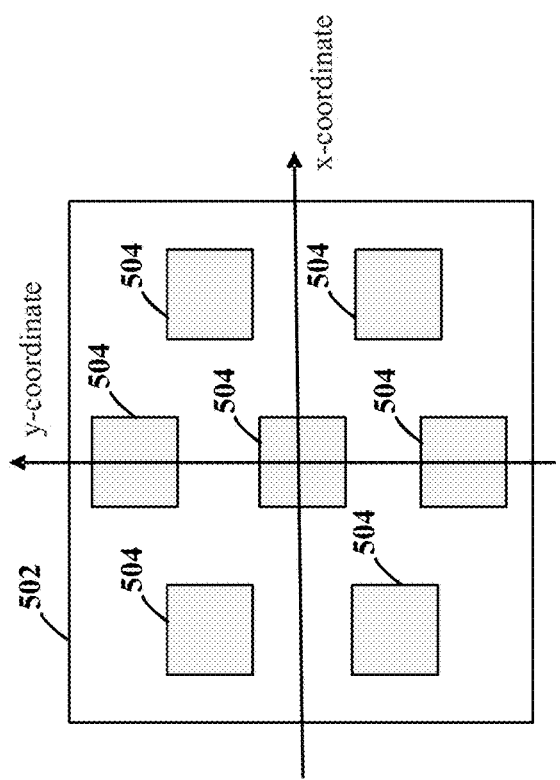
FIG. 5 is a diagram illustrating an IRS including a set of segments.

FIG. 5 is a diagram 500 illustrating an IRS including a set of segments. The IRS 502 may include a plurality of segments 504. Herein segments 504 may refer to activated areas on an IRS 502 where a desired surface phase is programmed. In other words, a segment may correspond to a programmatically activated subarea of an IRS 502, where the surface phase in that subarea may be suitably programmed. It should be appreciated that FIG. 5 is illustrative, and the number of segments 504 illustrated in FIG. 5 does not limit the disclosure. To perform the signal measurement, the base station may transmit control messages to the controller of the IRS 502 to activate one segment 504 at a time (e.g., each time may correspond to one or more reference signal symbols). The initial surface phase for each segment may be configured such that, most of the phase variations within a segment with respect to coordinates (x, y) have been sufficiently reduced. This may be achieved through an initial beam refinement procedure. Therefore, there may be one phase offset to measure per segment. Once the phase offsets are measured for all segments, the complete phase variation of the IRS 502 may be estimated based on an interpolation procedure. If the measurements or interpolation is performed after the initial beam refinement, then the interpolated phase may be added to the initial phase to obtain the final phase (e.g., a refined surface phase estimate).

The measured phase of a segment may be attributed to the geometric center of the segment. These phases may represent the negative of the desired phase shift for the segments. The complete surface phase may be obtained by finding the best fitting parameters of an interpolation function. One such interpolation function may be the quadratic interpolation given by: Phase $(x, y) = ax^2 + by^2 + cxy + dx + ey + f$. The coefficients/parameters {a, b, c, d, e, f} may be solved using the least squares method. The interpolation error resulting from the quadratic interpolation may be tolerable. If multiple IRSs are available and used together, the parameter "f" may be used to co-phase the multiple IRSs. Other interpolation functions may also be used. One example interpolation function may be based on reflection geometry that may produce no error by solving the {azimuth, elevation, radial distance} set directly.

The technique of surface phase sampling and interpolation may be described in further detail. A plurality of segments may be selected within the IRS. A segment k may be denoted by $S_k$, where k=1, K, k is the index of the segment, and K is the total number of segments. K may be sufficiently large to allow all parameters of the interpolation function to be estimated. For example, the quadratic model may have 6 parameters (or 5 if the parameter "f" is ignored, since the constant phase offset may be redundant), resulting in K equations with six unknowns: In this case, the value of K may be at least equal to six. As another example, the interpolation function using the {azimuth, elevation, radial distance} set may have three parameters: The value of K may be large enough to uniquely identify these parameters. The value of K may be larger still for additional processing gain or robustness, as well as to better condition the resulting set of equations with respect to measurement errors.

The center point of a segment $S_k$ may be denoted by $(x_k, y_k)$. The center points may be chosen to result in a well-conditioned set of equations in the unknown interpolation parameters. For example, the seven segments 504 shown in FIG. 5 may be a good selection. On the other hand, placing the segments close to each other in a localized area of the IRS may result in a poorly conditioned set of equations.

The size of a segment may be denoted by (Ax, Ay). The size of each segment may be large enough (e.g., larger than a threshold) to reflect sufficient energy. On the other hand, the size of each segment may not be so large that the measured phase cannot represent the phase of the center point of the segment. In one or more configurations, the sizes of the segments may not be the same. In different configurations, the segments may be overlapping or non-overlapping.

In one or more OFDM symbols, the base station may configure the IRS (e.g., by transmitting control messages to the IRS) such that $S_k$ is enabled for reflection and the rest of the IRS is disabled for reflection. The base station may transmit a reference signal during a symbol n. The reference signal may be an SSB or a CSI-RS. The UE may measure the channel based on the downlink reference signal, and may report the measurement results back to the base station. In another configuration, the base station may command the UE for SRS transmission, and may perform channel measurement at the base station based on channel reciprocity. In other configurations, the phase sampling and interpolation procedure may be controlled and coordinated by a UE.

$h_k$ may be the complex gain of the measured channel associated with $S_k$. The channel measurement may be performed and averaged over one or more OFDM symbols and subcarriers during the period when $S_k$ is activated for reflection. In one configuration, the channel measurement may be performed and averaged over all OFDM symbols and subcarriers during the period when Skis activated for reflection. The desired phase for the center point of $S_k$ may then be given by $a_k$=–angle $(h_k)$. Similar measurements may be obtained for each of the K segments in a similar fashion.

A system of linear equations may be set up for the quadratic parameters:

$$ax_k^2+by_k^2+cx_ky_k+dx_k+ey_k+f_k=a_k, k=1,\ldots,K$$

The coefficients/parameters {a, b, c, d, e, f} may, then, be solved based on the least squares method. In one configuration, the parameter "f" may be discarded as it gives a constant phase shift, which may be redundant. In another configuration, the quadratic equation may be applied to multiple IRSs simultaneously. The parameter "f" may be retained and used to co-phase the multiple IRSs.

In other configurations, non-quadratic interpolation may be used. In one configuration, the interpolation function may be based on the surface phase for beamforming at a given combination of an azimuth, an elevation, a radial distance, and a phase offset. In this case, the number of parameters may be four, and the phase offset parameter may be associated with a similar role as the parameter "f" in quadratic interpolation. In other words, the phase offset may be a fixed offset that may be ignored unless multiple IRSs are used together simultaneously and the phase offset may be used to co-phase the multiple IRSs.

In further configurations, other interpolation methods may also be used. Examples may include spline interpolation, higher-order polynomials based interpolation, etc. The number of segments and segment locations and sizes may be chosen such that a number of conditions are satisfied. First, a sufficient number of equations may be obtained to solve for the unknown interpolation parameters. Second, the equations may be well-conditioned (e.g., the ratio between the minimum eigenvalue to the maximum eigenvalue may be close to unity). Third, the segments may be large enough to reflect sufficient energy (the segment size may be increased with the increasing distance between the IRS and the measuring entity (e.g., the UE or the base station)). Fourth, the segments may be small enough so that the specified phase can be approximated as a constant phase throughout the segment, since the technique may be based on measuring a single phase per segment. A preceding stage of beam refinement may be utilized to make sure that the IRS surface phase is such that the reflected beam may be pointed in the general direction of the measuring entity (e.g., the UE or the base station).

The beam refinement stage may include one or more substages. In one configuration, the first substage may be based on virtual focal points using phase derivatives (which will be described in further detail below). Initial knowledge of the UE position or focusing may not be assumed for the first substage. This substage may yield an estimate of the surface phase for focusing at the UE, which may be coarse as the defocused beams may be associated with a low energy density. A second substage (e.g., a further refinement stage) may start with the surface phase estimate from the first substage. Therefore, somewhat focused beams toward the UE may be used. Further, a set of small segments may be used. A surface phase estimation may be performed based on phase measurements (rather than phase derivatives). The interpolated surface phase from the second substage may then be added to the interpolated surface phase from the first substage to produce the refined surface phase estimate. In one configuration, virtual focal points may not be used in the second substage. Instead, the surface phase from the first substage, which may produce beams mostly focused at the UE, may be used. In some configurations, the second substage may not follow the first substage described above. The second substage may be used by itself when a reasonable initial estimate of the UE focusing information is available. For example, in the tracking mode, the base station may periodically update the surface phase estimate as the UE moves. The surface phase from a prior iteration may be used as an initial setting. In that case, the interpolated phase may be added to the initial phase to obtain an updated phase.

In some configurations, if multiple IRSs are used to beamform to a UE, or if the surface area of an IRS is divided into multiple tiles (e.g., for better interpolation), then each IRS or tile may go through the above-described surface phase sampling and interpolation procedure for surface phase estimation. In particular, during the measurement step, the base station may enable one segment of one IRS or tile at a time. Therefore, K segments per IRS in combination with N IRSs may result in at least KN OFDM symbols during which an SSB/CSI-RS transmission or an SRS transmission may occur for channel measurement. The constant phase offset parameter (e.g., the "f" parameter in quadratic interpolation) may be used to co-phase the IRSs or tiles. The phase offset parameter may not be discarded. All IRSs or tiles may be automatically co-phased based on the phase offset parameter.

The quadradic interpolation described above may be used if wrapping of the phase does not occur, or if the phase may be unwrapped. In general, the integer a ambiguity (e.g., the difficulty in distinguishing between phases that differ from each other by multiples of $2\pi$) may represent a hindrance to the phase based sampling and interpolation technique.

Figure 6B:
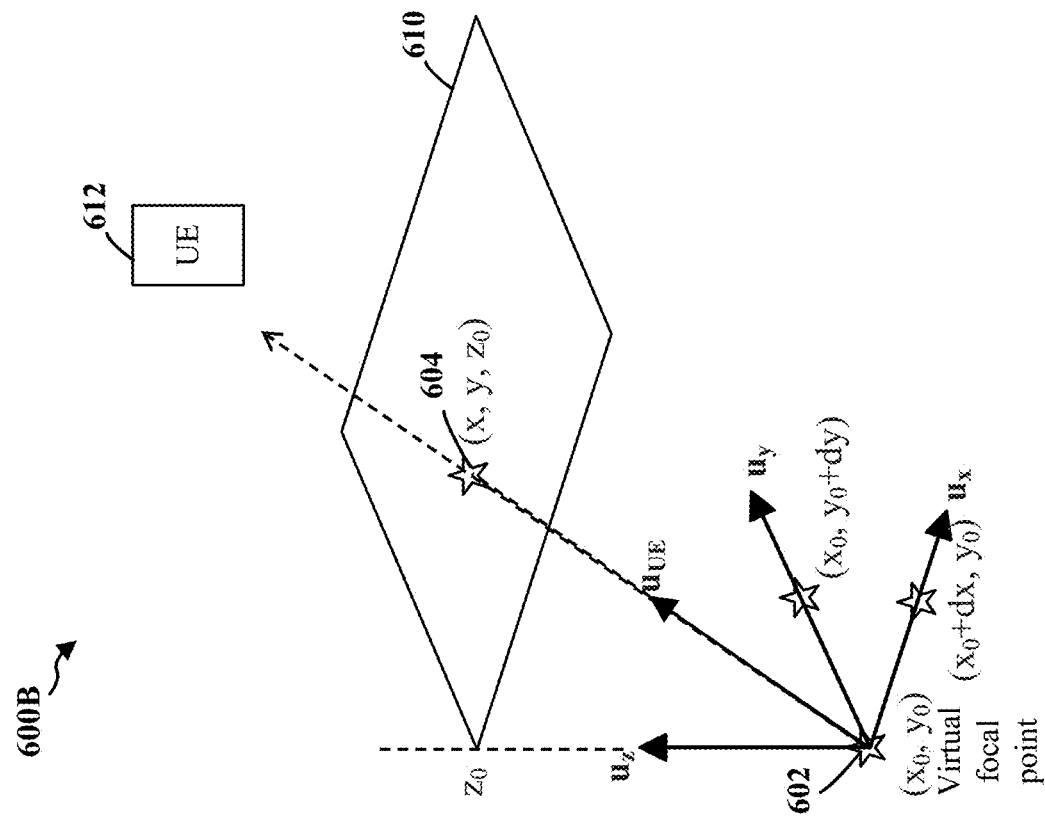
FIG. 6B is a diagram illustrating a coordinate system associated with a virtual focal point and an IRS.
Figure 6A:
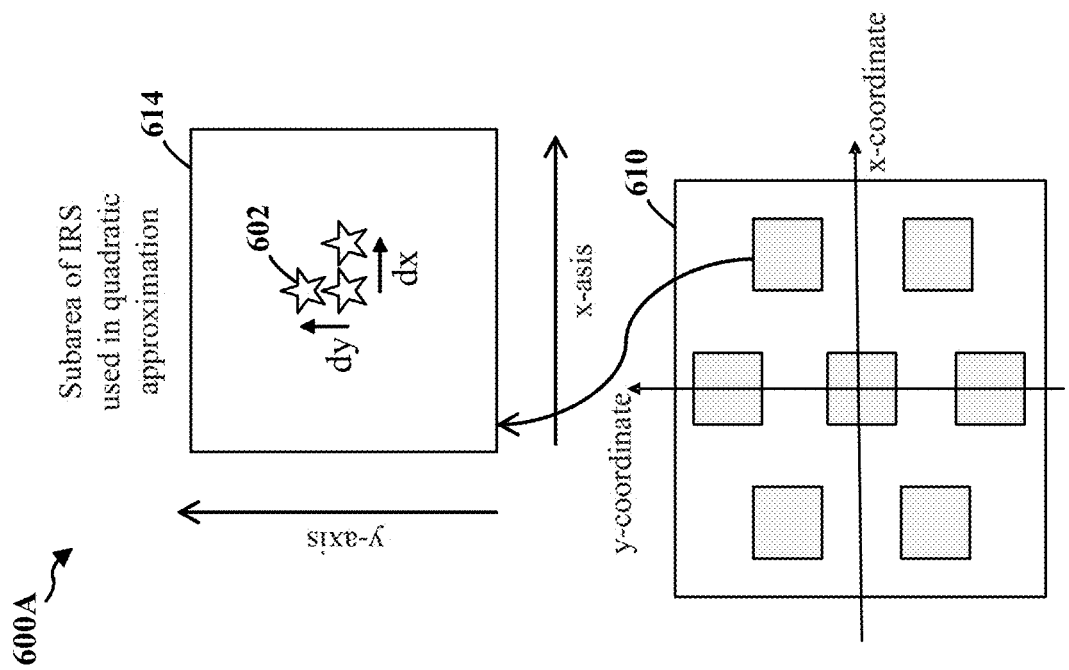
FIG. 6A is a diagram illustrating phase derivative based sampling and interpolation.

FIG. 6A is a diagram 600A illustrating phase derivative based sampling and interpolation. In one or more configurations, instead of the phase, the phase derivative along x- and y-axes measured using finite differencing may be utilized. Taking the derivative of the quadratic approximation with respect to x and y may yield two equations for each segment 614:

$d\_Phase(x,y)/dx = 2ax + cy + d$; and $d\_Phase(x,y)/dy = 2by + cx + e$.

The measurements for the first set of equations (which may be based on the derivative with respect to x) may be based on differencing the phases for two horizontally placed virtual focal points 602 (which may be separated by less than half a wavelength). For the second set of equations (which may be based on the derivative with respect to y), the measurements may be based on differencing the phases for two vertically placed virtual focal points 602 (which may be separated by less than half a wavelength).

In phase based quadradic interpolation, the parameter "f" may represent an overall constant phase, which may be redundant. Nonetheless, the value of the parameter "f" may be estimated as part of least squares fitting. In the phase derivative based technique, there may be no parameter for the constant phase. In other words, estimation of the constant phase parameter may be avoided.

FIG. 6B is a diagram 600B illustrating a coordinate system associated with a virtual focal point and an IRS. The coordinates (x, y) for a single segment in the IRS 610 may correspond to the point 604 on the IRS 610 where a straight line drawn from the virtual focal point 602 to the target (e.g. a UE 612) intersects the IRS 610. The coordinates (x, y) may be used in quadratic fitting. A geometric formula may be used for identifying the coordinates (x, y). In particular, ($x_o$, $y_o$) may be the coordinates of the virtual focal point 602 associated with an IRS segment. Here, the x- and y-axes may be along the IRS 610, and the z-axis may be perpendicular to the IRS 610. $z_o$ may be the distance from the virtual focal point 602 to the IRS 610 along the z-axis. d_phase_x and d_phase_y may be the phase differences (based on the phase derivative technique) when the virtual focal point 602 is moved from ($x_o$, $y_o$) to ($x_o$+dx, $y_o$) and from ($x_o$, $y_o$) to ($x_o$, $y_o$+dy), respectively. For convenience, all variables may be described in units of the wavelength.

$u_x$, $u_y$, and $u_z$ may be the unit vectors for the x-, y-, and z-axes, respectively. $u_{UE} = (\alpha, \beta, \gamma)$ may be the unit vector towards the UE 612 (the UE 612 may be assumed to be in the far field). The measured phases may satisfy:

$d\_phase\_x/dx = <u_x, u_{UE}> = 1 \cdot \alpha + 0 \cdot \beta + 0 \cdot \gamma = \alpha$ $d\_phase\_y/dy = <u_y, u_{UE}> = 0 \cdot \alpha + 1 \cdot \beta + 0 \cdot \gamma = \beta$ $\gamma = (1 - \alpha^2 - \beta^2)^{1/2}$ (from the unit vector definition)

Therefore, (x, y, $z_o$) = ($z_o/\gamma$) × ($\alpha$, $\beta$, $\gamma$). Thus, the coordinates (x, y) may be obtained as:

$(x, y) = (x_o, y_o) + (z_o)/\gamma \cdot (\alpha, \beta)$, where:

$\alpha = d\_phase\_x/dx$ (from a measured phase derivative), $\beta = d\_phase\_y/dy$ (from a measured phase derivative), and $\gamma = (1 - \alpha^2 - \beta^2)^{1/2}$ (from the unit vector definition).

Figure 7:
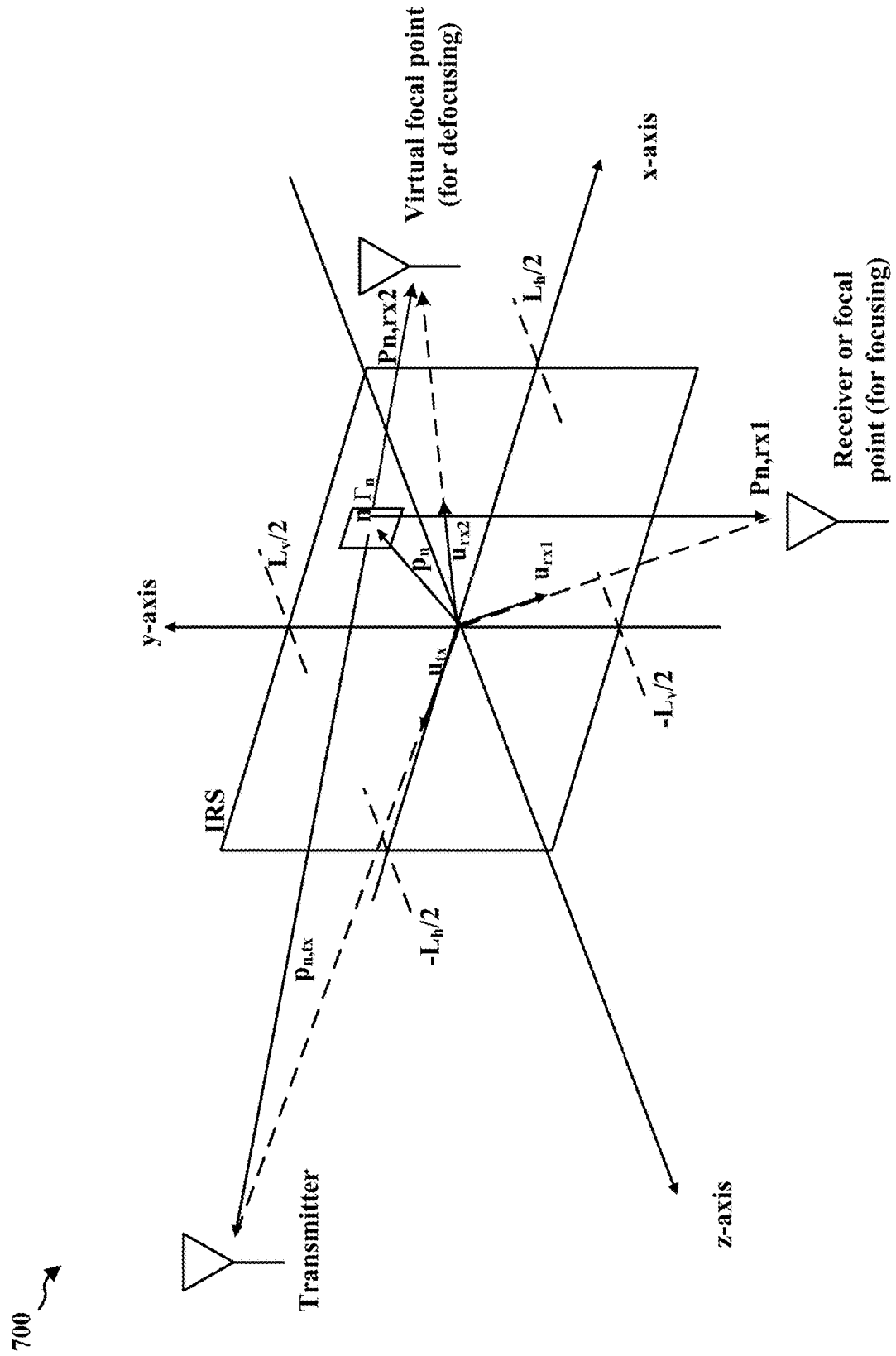
FIG. 7 is a diagram illustrating various parameters involved in the focusing and defocusing operation of an IRS.

FIG. 7 is a diagram 700 illustrating various parameters involved in the focusing and defocusing operation of an IRS. An IRS (e.g., the IRS 404/502/610) may implement a focusing operation to beamform toward a UE (e.g., the UE 406/612), where the phases of received rays may align. Unlike open-loop beamforming, focusing may take into account the radial distance of the UE from the IRS, in addition to the azimuth and the elevation of the UE. Focusing may be achieved by setting the surface phase of the IRS in a particular way.

As illustrated, $p_{n,tx}$, may be a vector from the surface element n to the Tx point. $p_{n,rx1}$ may be a vector from the surface element n to the Rx point. $p_{n,rx2}$ may be a vector from the surface element n to the virtual Rx point. $p_n$ may be a vector from the origin to the surface element n. $u_{tx}$ may be a unit vector from the origin to the Tx point. $u_{rx1}$ may be a unit vector from the origin to the Rx point. $u_{rx2}$ may be a unit vector from the origin to the virtual Rx point. $\Gamma_n$ may be the reflection coefficient at the surface element n.

To focus from the Tx point tx to the Rx point rx1, $\Gamma_n$=exp $(j2\pi(d_{n,tx}+d_{n,rx})/\lambda)$, where $d_{n,tx}=|p_{n,tx}|$ and $d_{n,rx}=|p_{n,rx1}|$, and $\lambda$ is the operating wavelength.

To focus at infinity (which may form a narrow beam), $\Gamma_n$ may be factorized as: $\Gamma_n = \Gamma^{tx}_n \Gamma^{rx}_n$, where $\Gamma^{tx}_n$=exp $(j2\pi d_{n,tx}/\lambda)$ and $\Gamma^{rx}_n$=exp $(j2\pi d_{n,rx1}/\lambda)$. The calculations may be used for either or both of $\Gamma^{tx}_n$ and $\Gamma^{rx}_n$. On the transmitter side, $d_{n,tx}=-<p_n, u_{tx}>$. On the receiver side (which may apply to the real focal point "rx1"), $d_{n,rx}=-<p_n, u_{rx1}>$.

Defocusing may apply mainly to the Rx side (e.g., the downlink), and may be used to generate wide beams. To defocus, the negative of the distance from the surface element n to the virtual focal point rx2 may be used: $d_{n,rx}=-|p_{n,rx2}|$. With the wide beam formed using defocusing, it may be as if the signals have been transmitted by a transmitter located at the virtual focal point. In one aspect, an IRS may defocus on the azimuthal plane, but may focus at infinity in elevation. This may be achieved by ignoring the y-component when computing $d_{n,rx}$. The width (e.g., the angular spread) of a defocused wide beam may be adjusted by adjusting the radial distance of the virtual focal point to the IRS. The direction of a defocused wide beam may be adjusted by adjusting the horizontal and/or vertical positions of the virtual focal point relative to the IRS.

In one configuration, when virtual focal points and phase derivatives are used for each segment for sampling and interpolation, the technique may be performed using the entire IRS in the measurement step.

Figure 8:
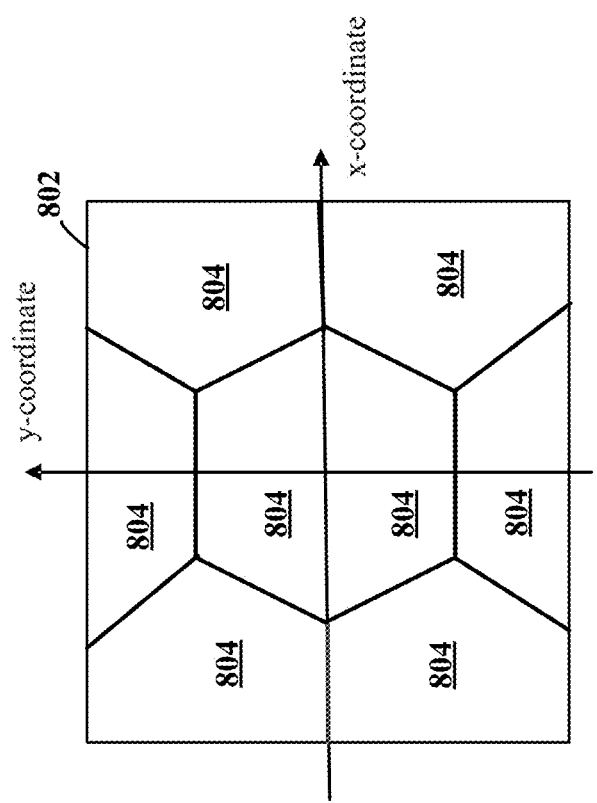
FIG. 8 is a diagram illustrating an IRS in which segments are identified.

FIG. 8 is a diagram 800 illustrating an IRS in which segments are identified. Compared to the IRS 502 in FIG. 5, the IRS 802 in FIG. 8 may include segments 804 that may cover the entire IRS 802. Accordingly, the entire IRS 802 may be used in the measurement step when virtual focal points and phase derivatives are used for sampling and interpolation. It should be appreciated that FIG. 8 is illustrative, and the number of segments 804 illustrated in FIG. 8 does not limit the disclosure. Segments 804 may be large (e.g., larger than a threshold) when virtual focal points are used because despite the size of each segment, a point (x, y) (e.g., the point in the segment where a straight line drawn from the virtual focal point to the target intersects the segment) within the segment may be designated for use in the interpolation equations. The computation of the (x, y) coordinates for a segment when virtual focal points are used is described in detail above and shown in FIG. 6B. Because the reflected energy may be proportional to the size of the active area, using larger segments, such as segments 804, may be associated with energy benefits.

Once quadratic coefficients/parameters are computed based on wide beams, the quadratic fit may be verified based on a focused beam formed using the computed quadratic model. Over the focused beam, the IRS segmentation based channel estimation may be performed. The verification stage may be useful because a wide beam may have a high pathloss, potentially rendering the quadratic coefficient/ parameter estimation noisy. In the verification stage, the channel coefficients/parameters may be estimated using a focused beam. Therefore, the IRS segmentation based channel estimation may work on a much stronger signal. In the verification stage, the IRS segmentation may be different from the IRS segmentation used when the channels are measured based on the wide beam. In particular, in the verification stage, the segments may be smaller as the focused beams may provide a sufficient path gain. Further, the verification stage may be based on the quadratic model itself rather than the derivative of the quadratic model. To obtain a revised phase, any correction derived from the verification stage may be added to the initial phase that was obtained using virtual focal points in the prior stage.

Although the wide beam and phase derivative based technique has been described above based on a spherical phase front (e.g., a single virtual focal point per segment), it may be possible to use cylindrical or other types of wide beams based on a virtual focal region in the form of a line segment, etc. Some of the non-spherical phase fronts may be associated with a lower pathloss. For example, a cylindrical phase front may be used for azimuth detection. Then, the phase front may be narrowed down in azimuth for a higher path gain.

Figure 9:
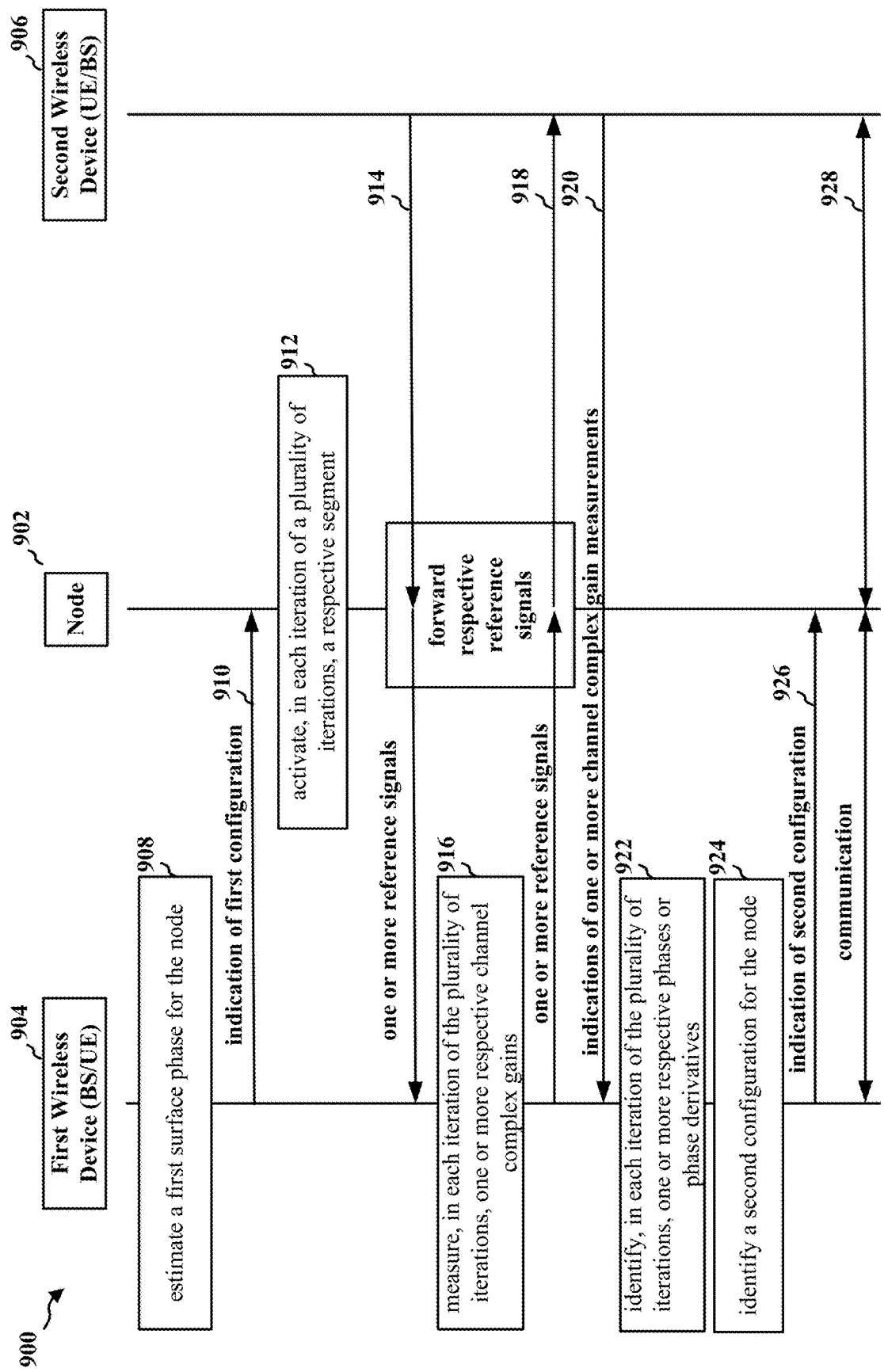
FIG. 9 is a diagram of a communication flow of a method of wireless communication.

FIG. 9 is a diagram of a communication flow 900 of a method of wireless communication. At 908, the first wireless device 904 may estimate a first surface phase for the node 902 based on at least one wide beam from the node 902. A second configuration for the node may be identified based at least in part on the estimated first surface phase.

At 910, the first wireless device 904 may transmit, to a node 902, and the node 902 may receive, from the first wireless device 904, in each iteration of a plurality of iterations, an indication of a first configuration for the node 902 associated with activating a respective segment of a plurality of segments of an IRS of the node 902. Each iteration of the plurality of iterations may correspond to one segment of the plurality of segments In one configuration, a distance between the IRS of the node 902 and the first wireless device 904 may be greater than a second threshold.

At 912, the node 902 may activate, in each iteration of a plurality of iterations, a respective segment of a plurality of segments of an IRS of the node 902. The activation of the respective segment may be based on the first configuration.

At 914, the first wireless device 904 may receive, from the second wireless device 906, in each iteration of the plurality of iterations, the one or more respective reference signals of the plurality of reference signals via the respective segment corresponding to the iteration.

At 916, the first wireless device 904 may measure, in each iteration of the plurality of iterations, one or more respective channel complex gains over one or more OFDM symbols based on the received one or more respective reference signals. The one or more respective phases or phase derivatives may be identified based on the one or more respective channel complex gain measurements.

In additional configurations, 918 and 920 may be performed as an alternative to 914 and 916. At 918, the first wireless device 904 may transmit, to the second wireless device 906, in each iteration of the plurality of iterations, the one or more respective reference signals of the plurality of reference signals via the respective segment corresponding to the iteration.

At 920, the first wireless device 904 may receive, from the second wireless device 906, in each iteration of the plurality of iterations, one or more respective indications of one or more respective channel complex gain measurements based on the one or more respective reference signals. The one or more respective channel complex gain measurements may be over one or more OFDM symbols. The one or more respective phases or phase derivatives may be identified based on the one or more respective channel complex gain measurements.

Therefore, at 914 or 918, the node 902 may forward, from a first wireless device 904 to a second wireless device 906 or from the second wireless device 906 to the first wireless device 904, in each iteration of the plurality of iterations, one or more respective reference signals of a plurality of reference signals via the respective segment of the plurality of segments of the IRS corresponding to the iteration.

In one configuration, the first wireless device 904 may be a first base station or a first UE. The second wireless device 906 may be a second UE when the first wireless device 904 is the first base station. The second wireless device 906 may be a second base station when the first wireless device 904 is the first UE.

In one configuration, the one or more respective reference signals may include one or more SSBs (for the downlink), one or more CSI-RSs (for the downlink), or one or more SRSs (for the uplink).

At 922, the first wireless device 904 may identify, in each iteration of the plurality of iterations, one or more respective phases or phase derivatives of a plurality of phases or phase derivatives based on one or more respective reference signals of a plurality of reference signals. The one or more respective phases or phase derivatives may be associated with the respective segment. The plurality of phases or phase derivatives may be associated with the plurality of segments.

At 924, the first wireless device 904 may identify a second configuration for the node 902 associated with generating one or more reflected beams from the IRS of the node 902 toward the first wireless device 904 or a second wireless device 906.

In one configuration, the second configuration may be identified based on an interpolation process based on the plurality of phases or phase derivatives associated with the plurality of segments.

In one configuration, the interpolation process may include one of quadratic interpolation, geometric interpolation, spline interpolation, or higher order polynomial interpolation. A number of phases or phase derivatives in the plurality of phases or phase derivatives may be greater than or equal to a number of unknown parameters to be solved in the interpolation process.

In one configuration, the respective segment may be associated with at least one wide beam associated with at least one virtual focal point when the interpolation process is based on the plurality of phase derivatives. Each phase derivative of the plurality of phase derivatives may be associated with two virtual focal points.

In one configuration, the interpolation process may yield a phase offset parameter associated with co-phasing the IRS of the node and one or more other IRSs when the IRS of the node is used in conjunction with the one or more other IRSs.

In one configuration, the interpolation process may be associated with a set of equations. An absolute difference between 1 and a ratio between a minimum eigenvalue associated with the set of equations and a maximum eigenvalue associated with the set of equations may be less than a first threshold.

At 926, the first wireless device 904 may transmit, to the node 902, and the node 902 may receive, from the first wireless device 904, an indication of the second configuration for the node 902 associated with generating the one or more reflected beams.

At 928, the first wireless device 904 may communicate with the second wireless device 906 via the node 902 based on the second configuration and the one or more reflected beams. The node 902 may forward, from the first wireless device 904 to the second wireless device 906 or from the second wireless device 906 to the first wireless device 904, communications via the IRS based on the second configuration and the one or more reflected beams.

In one configuration, the one or more reflected beams may be toward the first wireless device 904.

In one configuration, the one or more reflected beams may be toward the second wireless device 906.

Figure 10:
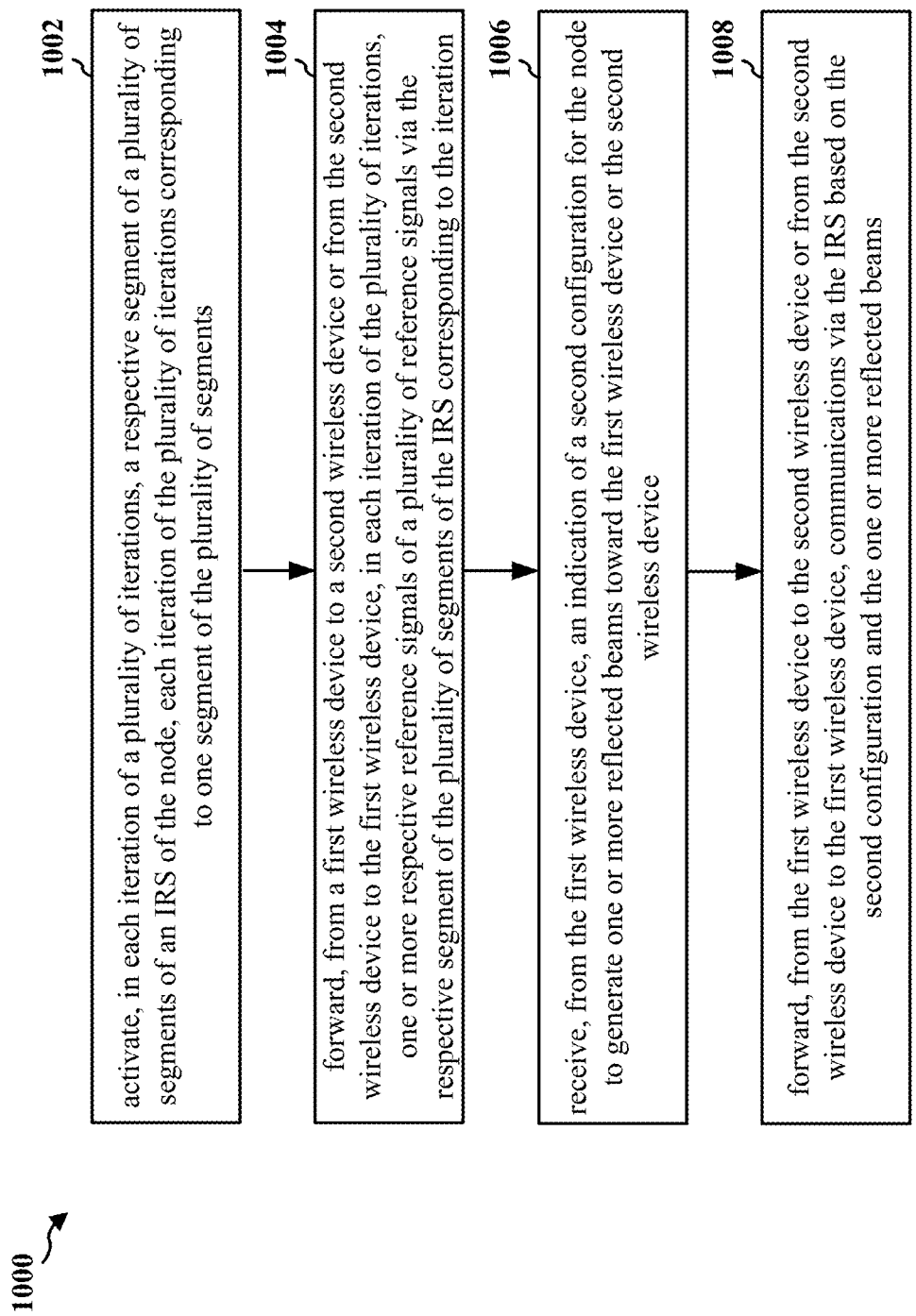
FIG. 10 is a flowchart of a method of wireless communication.

FIG. 10 is a flowchart 1000 of a method of wireless communication. The method may be performed by a node (e.g., the node/IRS 103/902; the apparatus 1402). At 1002, the node may activate, in each iteration of a plurality of iterations, a respective segment of a plurality of segments of an IRS of the node. Each iteration of the plurality of iterations may correspond to one segment of the plurality of segments. For example, 1002 may be performed by the IRS beam component 1440 in FIG. 14. Referring to FIG. 9, at 912, the node 902 may activate, in each iteration of a plurality of iterations, a respective segment of a plurality of segments of an IRS of the node 902.

At 1004, the node may forward, from a first wireless device to a second wireless device or from the second wireless device to the first wireless device, in each iteration of the plurality of iterations, one or more respective reference signals of a plurality of reference signals via the respective segment of the plurality of segments of the IRS corresponding to the iteration. For example, 1004 may be performed by the IRS beam component 1440 in FIG. 14. Referring to FIG. 9, at 914 or 918, the node 902 may forward, from a first wireless device 904 to a second wireless device 906 or from the second wireless device 906 to the first wireless device 904, in each iteration of the plurality of iterations, one or more respective reference signals of a plurality of reference signals via the respective segment of the plurality of segments of the IRS corresponding to the iteration.

At 1006, the node may receive, from the first wireless device, an indication of a second configuration for the node to generate one or more reflected beams toward the first wireless device or the second wireless device. For example, 1006 may be performed by the IRS beam component 1440 in FIG. 14. Referring to FIG. 9, at 926, the node 902 may receive, from the first wireless device 904 or the second wireless device 906, an indication of a second configuration for the node 902 to generate one or more reflected beams toward the first wireless device 904 or the second wireless device 906.

At 1008, the node may forward, from the first wireless device to the second wireless device or from the second wireless device to the first wireless device, communications via the IRS based on the second configuration and the one or more reflected beams. For example, 1008 may be performed by the IRS beam component 1440 in FIG. 14. Referring to FIG. 9, at 928, the node 902 may forward, from the first wireless device 904 to the second wireless device 906 or from the second wireless device 906 to the first wireless device 904, communications via the IRS based on the second configuration and the one or more reflected beams.

Figure 11:
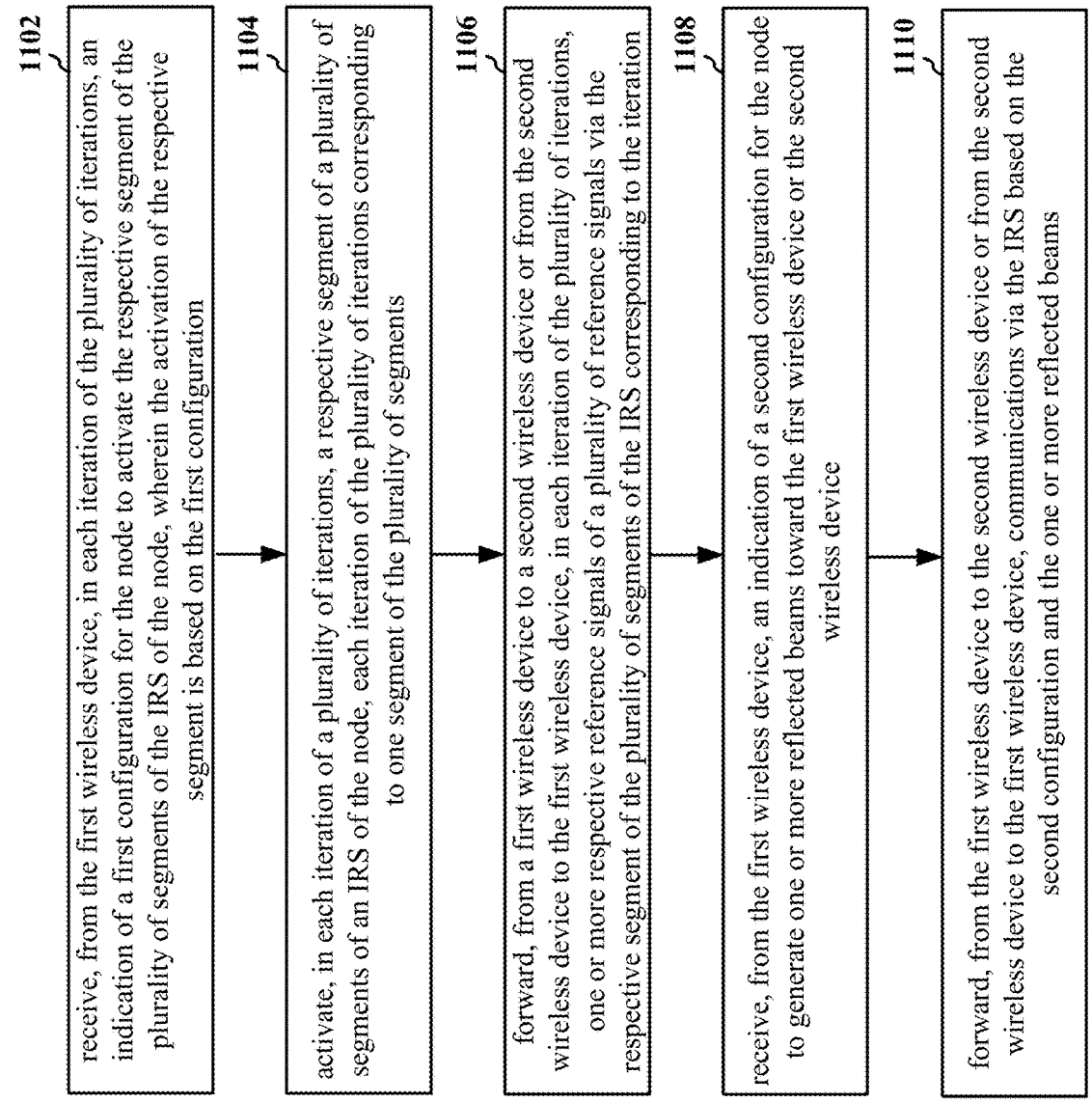
FIG. 11 is a flowchart of a method of wireless communication.

FIG. 11 is a flowchart 1100 of a method of wireless communication. The method may be performed by a node (e.g., the node/IRS 103/902; the apparatus 1402). At 1104, the node may activate, in each iteration of a plurality of iterations, a respective segment of a plurality of segments of an IRS of the node. Each iteration of the plurality of iterations may correspond to one segment of the plurality of segments. For example, 1104 may be performed by the IRS beam component 1440 in FIG. 14. Referring to FIG. 9, at 912, the node 902 may activate, in each iteration of a plurality of iterations, a respective segment of a plurality of segments of an IRS of the node 902.

At 1106, the node may forward, from a first wireless device to a second wireless device or from the second wireless device to the first wireless device, in each iteration of the plurality of iterations, one or more respective reference signals of a plurality of reference signals via the respective segment of the plurality of segments of the IRS corresponding to the iteration. For example, 1106 may be performed by the IRS beam component 1440 in FIG. 14. Referring to FIG. 9, at 914 or 918, the node 902 may forward, from a first wireless device 904 to a second wireless device 906 or from the second wireless device 906 to the first wireless device 904, in each iteration of the plurality of iterations, one or more respective reference signals of a plurality of reference signals via the respective segment of the plurality of segments of the IRS corresponding to the iteration.

At 1108, the node may receive, from the first wireless device, an indication of a second configuration for the node to generate one or more reflected beams toward the first wireless device or the second wireless device. For example, 1108 may be performed by the IRS beam component 1440 in FIG. 14. Referring to FIG. 9, at 926, the node 902 may receive, from the first wireless device 904 or the second wireless device 906, an indication of a second configuration for the node 902 to generate one or more reflected beams toward the first wireless device 904 or the second wireless device 906.

At 1110, the node may forward, from the first wireless device to the second wireless device or from the second wireless device to the first wireless device, communications via the IRS based on the second configuration and the one or more reflected beams. For example, 1110 may be performed by the IRS beam component 1440 in FIG. 14. Referring to FIG. 9, at 928, the node 902 may forward, from the first wireless device 904 to the second wireless device 906 or from the second wireless device 906 to the first wireless device 904, communications via the IRS based on the second configuration and the one or more reflected beams.

In one configuration, the first wireless device may be a first base station or a first UE. The second wireless device may be a second UE when the first wireless device is the first base station. The second wireless device may be a second base station when the first wireless device is the first UE.

In one configuration, at 1102, the node may receive, from the first wireless device, in each iteration of the plurality of iterations, an indication of a first configuration for the node to activate the respective segment of the plurality of segments of the IRS of the node. The activation of the respective segment may be based on the first configuration. For example, 1102 may be performed by the IRS beam component 1440 in FIG. 14. Referring to FIG. 9, at 910, the node 902 may receive, from the first wireless device 904, in each iteration of the plurality of iterations, an indication of a first configuration for the node to activate the respective segment of the plurality of segments of the IRS of the node 902.

In one configuration, the second configuration may be based on an interpolation process based on a plurality of phases or phase derivatives associated with the plurality of segments. Each of the plurality of phases or phase derivatives may be associated with one point included in a corresponding segment of the plurality of segments.

In one configuration, the interpolation process may include one of quadratic interpolation, geometric interpolation, spline interpolation, or higher order polynomial interpolation.

In one configuration, the plurality of phases or phase derivatives may be based on a plurality of channel complex gain measurements based on the plurality of reference signals, and each of the plurality of channel complex gain measurements is over one or more OFDM symbols.

In one configuration, the forwarding of the one or more respective reference signals may be based on at least one wide beam associated with at least one virtual focal point when the interpolation process is based on the plurality of phase derivatives. Each phase derivative of the plurality of phase derivatives may be associated with two virtual focal points.

In one configuration, a number of phases or phase derivatives in the plurality of phases or phase derivatives may be greater than or equal to a number of unknown parameters to be solved in the interpolation process.

In one configuration, the interpolation process may yield a phase offset parameter for co-phasing the IRS of the node and one or more other IRSs when the IRS of the node is used in conjunction with the one or more other IRSs.

In one configuration, the interpolation process may be associated with a set of equations. An absolute difference between 1 and a ratio between a minimum eigenvalue associated with the set of equations and a maximum eigenvalue associated with the set of equations may be less than a first threshold.

In one configuration, the one or more respective reference signals may include one or more SSBs, one or more CSI-RSs, or one or more SRSs.

In one configuration, in the plurality of iterations, the forwarding of the one or more respective reference signals may be associated with a same forwarding direction toward a receiving wireless device of the first wireless device and the second wireless device. The one or more reflected beams may be toward the receiving wireless device.

In one configuration, a distance between the IRS of the node and the receiving wireless device may be greater than a second threshold.

Figure 12:
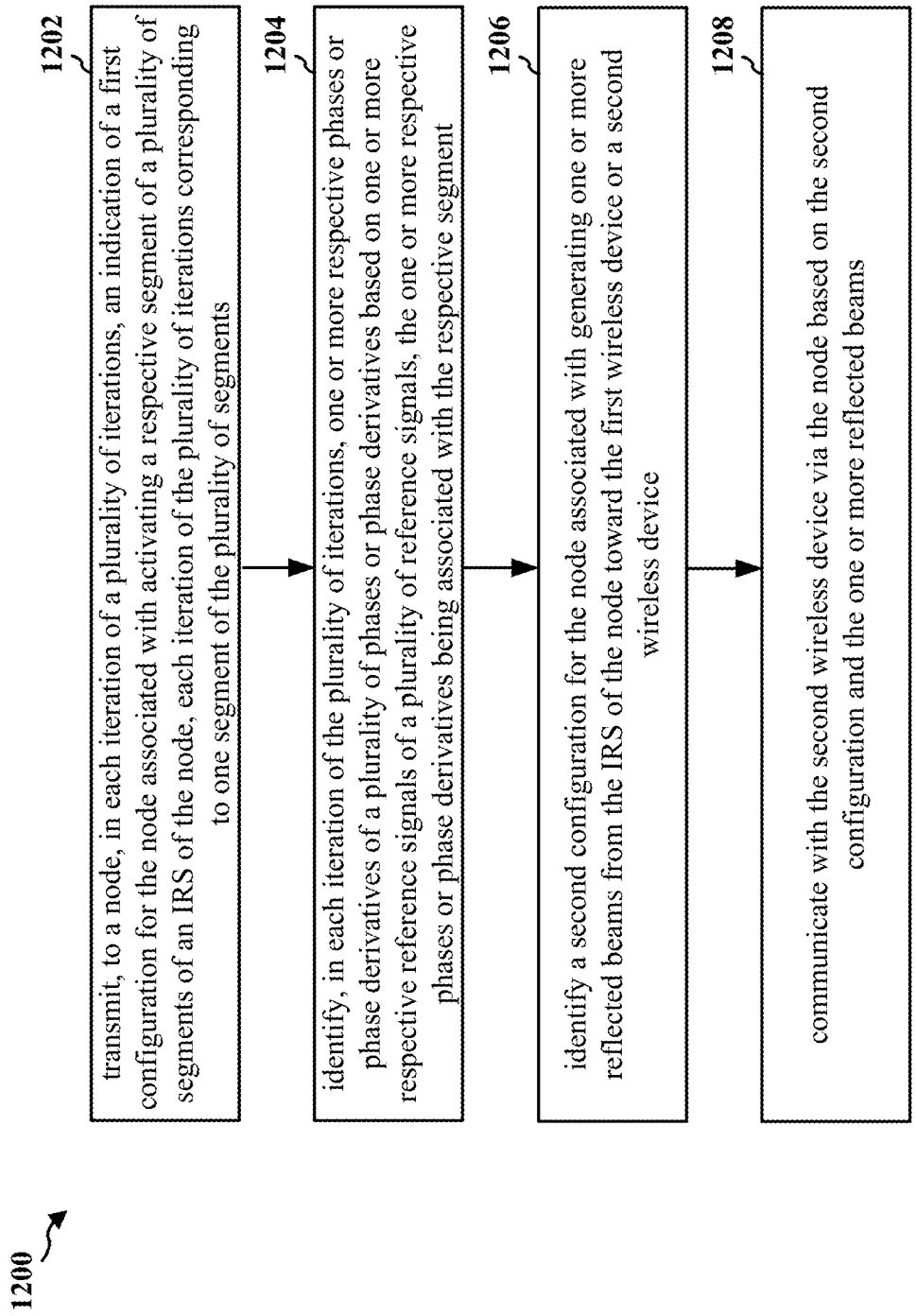
FIG. 12 is a flowchart of a method of wireless communication.

FIG. 12 is a flowchart 1200 of a method of wireless communication. The method may be performed by a first wireless device (e.g., the base station 102/180/310; the UE 104/350; the first wireless device (base station/UE) 904; the apparatus 1502). At 1202, the first wireless device may transmit, to a node, in each iteration of a plurality of iterations, an indication of a first configuration for the node associated with activating a respective segment of a plurality of segments of an IRS of the node. Each iteration of the plurality of iterations may correspond to one segment of the plurality of segments. For example, 1202 may be performed by the IRS beam component 1540 in FIG. 15. Referring to FIG. 9, at 910, the first wireless device 904 may transmit, to a node 902, in each iteration of a plurality of iterations, an indication of a first configuration for the node 902 associated with activating a respective segment of a plurality of segments of an IRS of the node 902.

At 1204, the first wireless device may identify, in each iteration of the plurality of iterations, one or more respective phases or phase derivatives of a plurality of phases or phase derivatives based on one or more respective reference signals of a plurality of reference signals. The one or more respective phases or phase derivatives may be associated with the respective segment. The plurality of phases or phase derivatives may be associated with the plurality of segments. For example, 1204 may be performed by the IRS beam component 1540 in FIG. 15. Referring to FIG. 9, at 922, the first wireless device 904 may identify, in each iteration of the plurality of iterations, one or more respective phases or phase derivatives of a plurality of phases or phase derivatives based on one or more respective reference signals of a plurality of reference signals.

At 1206, the first wireless device may identify a second configuration for the node associated with generating one or more reflected beams from the IRS of the node toward the first wireless device or a second wireless device. For example, 1206 may be performed by the IRS beam component 1540 in FIG. 15. Referring to FIG. 9, at 924, the first wireless device 904 may identify a second configuration for the node 902 associated with generating one or more reflected beams from the IRS of the node 902 toward the first wireless device 904 or a second wireless device 906.

At 1208, the first wireless device may communicate with the second wireless device via the node based on the second configuration and the one or more reflected beams. For example, 1208 may be performed by the IRS beam component 1540 in FIG. 15. Referring to FIG. 9, at 928, the first wireless device 904 may communicate with the second wireless device 906 via the node 902 based on the second configuration and the one or more reflected beams.

Figure 13:
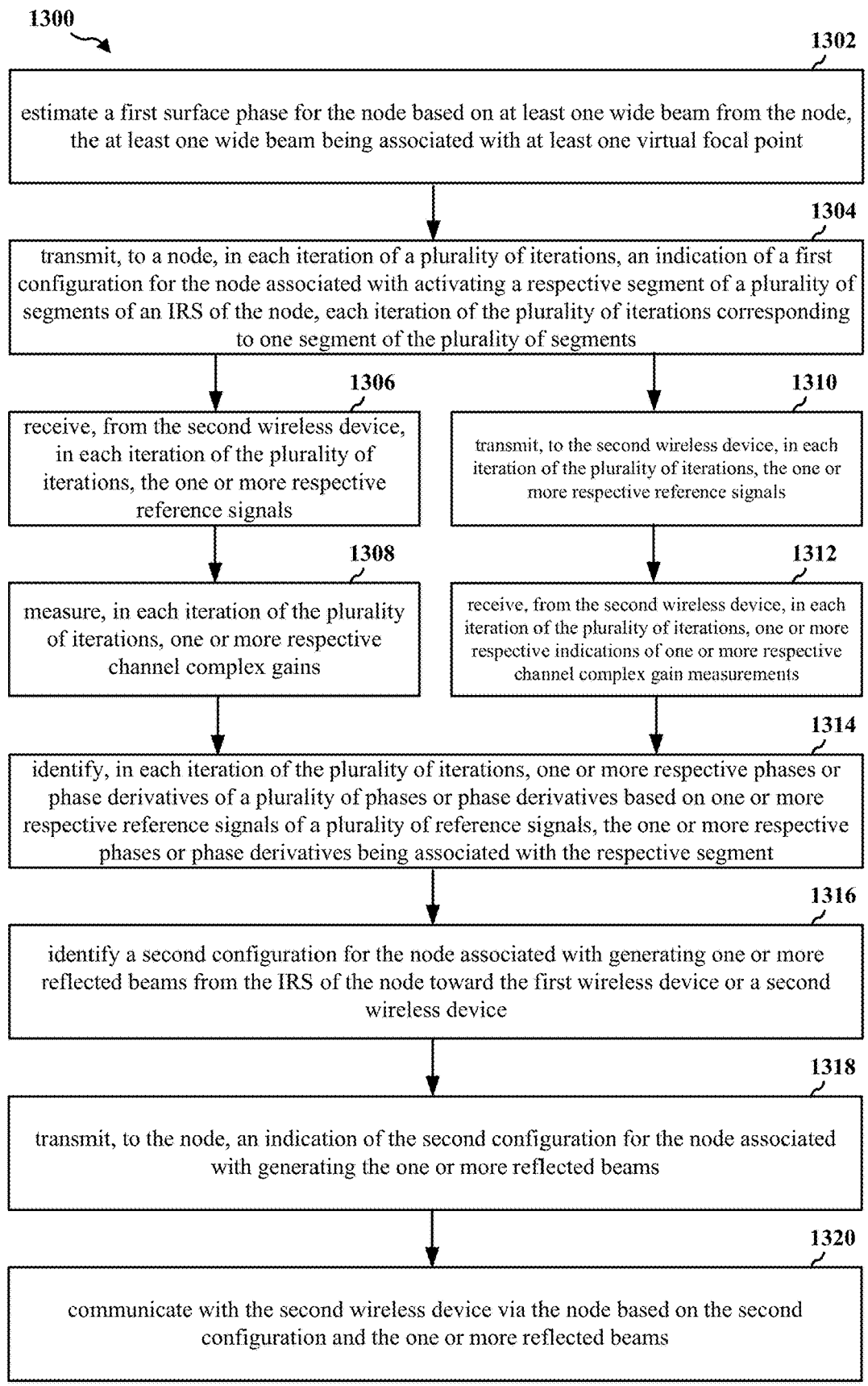
FIG. 13 is a flowchart of a method of wireless communication.

FIG. 13 is a flowchart 1300 of a method of wireless communication. The method may be performed by a first wireless device (e.g., the base station 102/180/310; the UE 104/350; the first wireless device (base station/UE) 904; the apparatus 1502). At 1304, the first wireless device may transmit, to a node, in each iteration of a plurality of iterations, an indication of a first configuration for the node associated with activating a respective segment of a plurality of segments of an IRS of the node. Each iteration of the plurality of iterations may correspond to one segment of the plurality of segments. For example, 1304 may be performed by the IRS beam component 1540 in FIG. 15. Referring to FIG. 9, at 910, the first wireless device 904 may transmit, to a node 902, in each iteration of a plurality of iterations, an indication of a first configuration for the node 902 associated with activating a respective segment of a plurality of segments of an IRS of the node 902.

At 1314, the first wireless device may identify, in each iteration of the plurality of iterations, one or more respective phases or phase derivatives of a plurality of phases or phase derivatives based on one or more respective reference signals of a plurality of reference signals. The one or more respective phases or phase derivatives may be associated with the respective segment. The plurality of phases or phase derivatives may be associated with the plurality of segments. For example, 1314 may be performed by the IRS beam component 1540 in FIG. 15. Referring to FIG. 9, at 922, the first wireless device 904 may identify, in each iteration of the plurality of iterations, one or more respective phases or phase derivatives of a plurality of phases or phase derivatives based on one or more respective reference signals of a plurality of reference signals.

At 1316, the first wireless device may identify a second configuration for the node associated with generating one or more reflected beams from the IRS of the node toward the first wireless device or a second wireless device. For example, 1316 may be performed by the IRS beam component 1540 in FIG. 15. Referring to FIG. 9, at 924, the first wireless device 904 may identify a second configuration for the node 902 associated with generating one or more reflected beams from the IRS of the node 902 toward the first wireless device 904 or a second wireless device 906.

At 1320, the first wireless device may communicate with the second wireless device via the node based on the second configuration and the one or more reflected beams. For example, 1320 may be performed by the IRS beam component 1540 in FIG. 15. Referring to FIG. 9, at 928, the first wireless device 904 may communicate with the second wireless device 906 via the node 902 based on the second configuration and the one or more reflected beams.

In one configuration, the first wireless device may be a first base station or a first UE. The second wireless device may be a second UE when the first wireless device is the first base station. The second wireless device may be a second base station when the first wireless device is the first UE.

In one configuration, at 1306, the first wireless device may receive, from the second wireless device, in each iteration of the plurality of iterations, the one or more respective reference signals of the plurality of reference signals via the respective segment corresponding to the iteration. For example, 1306 may be performed by the IRS beam component 1540 in FIG. 15. Referring to FIG. 9, at 914, the first wireless device 904 may receive, from the second wireless device 906, in each iteration of the plurality of iterations, the one or more respective reference signals of the plurality of reference signals via the respective segment corresponding to the iteration. At 1308, the first wireless device may measure, in each iteration of the plurality of iterations, one or more respective channel complex gains over one or more OFDM symbols based on the received one or more respective reference signals. The one or more respective phases or phase derivatives may be identified based on the one or more respective channel complex gain measurements. For example, 1308 may be performed by the IRS beam component 1540 in FIG. 15. Referring to FIG. 9, at 916, the first wireless device 904 may measure, in each iteration of the plurality of iterations, one or more respective channel complex gains over one or more OFDM symbols based on the received one or more respective reference signals.

In one configuration, the one or more reflected beams may be toward the first wireless device.

In one configuration, a distance between the IRS of the node and the first wireless device may be greater than a second threshold.

In one configuration, at 1310, the first wireless device may transmit, to the second wireless device, in each iteration of the plurality of iterations, the one or more respective reference signals of the plurality of reference signals via the respective segment corresponding to the iteration. For example, 1310 may be performed by the IRS beam component 1540 in FIG. 15. Referring to FIG. 9, at 918, the first wireless device 904 may transmit, to the second wireless device 906, in each iteration of the plurality of iterations, the one or more respective reference signals of the plurality of reference signals via the respective segment corresponding to the iteration. At 1312, the first wireless device may receive, from the second wireless device, in each iteration of the plurality of iterations, one or more respective indications of one or more respective channel complex gain measurements based on the one or more respective reference signals. The one or more respective channel complex gain measurements may be over one or more OFDM symbols. The one or more respective phases or phase derivatives may be identified based on the one or more respective channel complex gain measurements. For example, 1312 may be performed by the IRS beam component 1540 in FIG. 15. Referring to FIG. 9, at 920, the first wireless device 904 may receive, from the second wireless device 906, in each iteration of the plurality of iterations, one or more respective indications of one or more respective channel complex gain measurements based on the one or more respective reference signals.

In one configuration, the one or more reflected beams may be toward the second wireless device.

In one configuration, at 1318, the first wireless device may transmit, to the node, an indication of the second configuration for the node associated with generating the one or more reflected beams. For example, 1318 may be performed by the IRS beam component 1540 in FIG. 15. Referring to FIG. 9, at 926, the first wireless device 904 may transmit, to the node 902, an indication of the second configuration for the node 902 associated with generating the one or more reflected beams.

In one configuration, the second configuration may be identified based on an interpolation process based on the plurality of phases or phase derivatives associated with the plurality of segments.

In one configuration, the interpolation process may include one of quadratic interpolation, geometric interpolation, spline interpolation, or higher order polynomial interpolation. A number of phases or phase derivatives in the plurality of phases or phase derivatives may be greater than or equal to a number of unknown parameters to be solved in the interpolation process.

In one configuration, the respective segment may be associated with at least one wide beam associated with at least one virtual focal point when the interpolation process is based on the plurality of phase derivatives. Each phase derivative of the plurality of phase derivatives may be associated with two virtual focal points.

In one configuration, the interpolation process may yield a phase offset parameter associated with co-phasing the IRS of the node and one or more other IRSs when the IRS of the node is used in conjunction with the one or more other IRSs.

In one configuration, the interpolation process may be associated with a set of equations. An absolute difference between 1 and a ratio between a minimum eigenvalue associated with the set of equations and a maximum eigenvalue associated with the set of equations is less than a first threshold.

In one configuration, the one or more respective reference signals may include one or more SSBs, one or more CSI-RSs, or one or more SRSs.

In one configuration, at 1302, the first wireless device may estimate a first surface phase for the node based on at least one wide beam from the node. The at least one wide beam may be associated with at least one virtual focal point. The second configuration for the node may be identified based at least in part on the estimated first surface phase. For example, 1302 may be performed by the IRS beam component 1540 in FIG. 15. Referring to FIG. 9, at 908, the first wireless device 904 may estimate a first surface phase for the node 902 based on at least one wide beam from the node 902.

Figure 14:
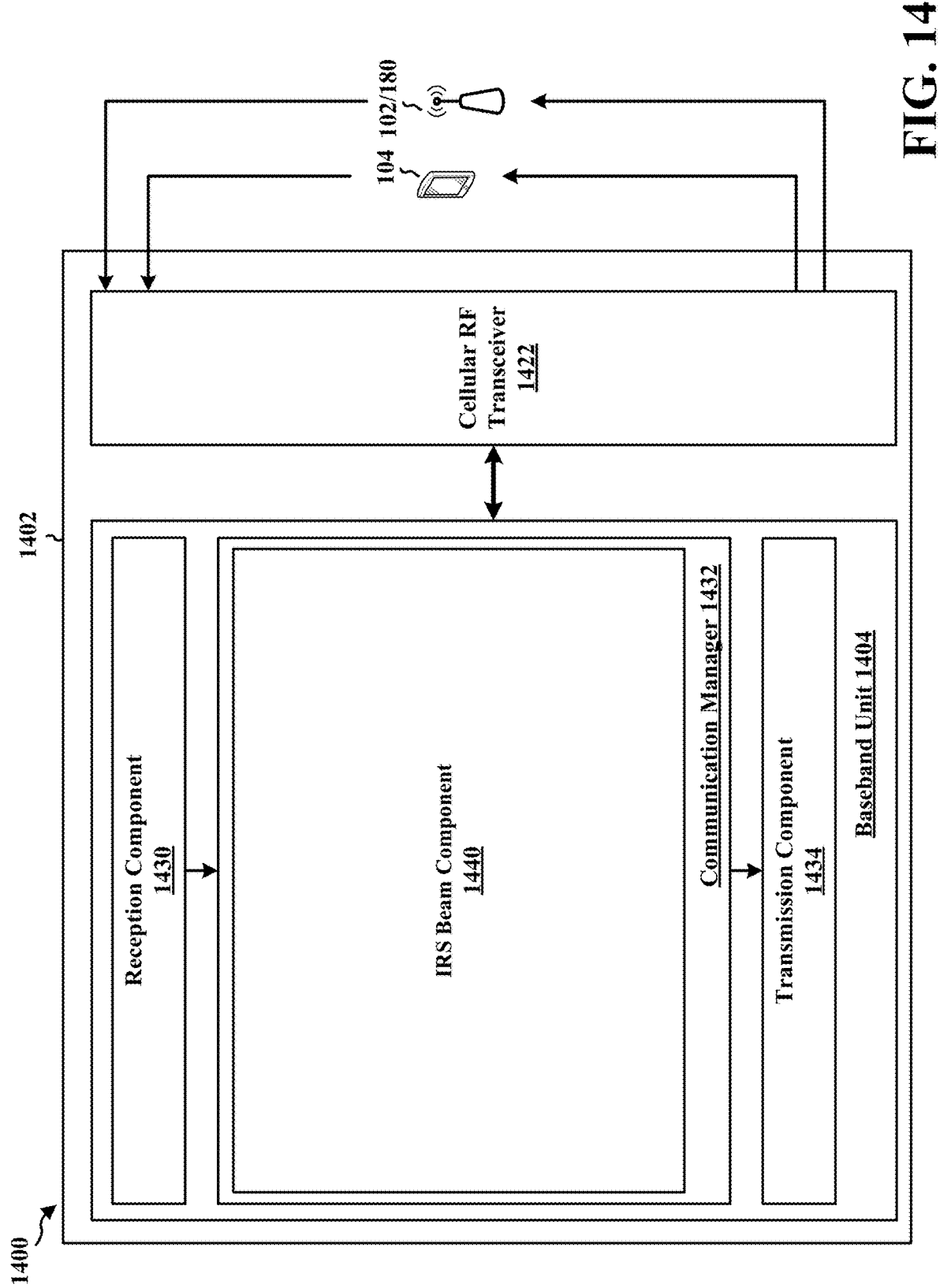
FIG. 14 is a diagram illustrating an example of a hardware implementation for an example apparatus.

FIG. 14 is a diagram 1400 illustrating an example of a hardware implementation for an apparatus 1402. The apparatus 1402 may be a node (IRS), a component of a node, or may implement node functionality. In some aspects, the apparatus 1402 may include a baseband unit 1404. The baseband unit 1404 may communicate through a cellular RF transceiver 1422 with the UE 104. The baseband unit 1404 may include a computer-readable medium/memory. The baseband unit 1404 is responsible for general processing, including the execution of software stored on the computer-readable medium/memory. The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404.

The communication manager 1432 may include an IRS beam component 1440 that may be configured to receive, from the first wireless device, in each iteration of the plurality of iterations, an indication of a first configuration for the node to activate the respective segment of the plurality of segments of the IRS of the node, e.g., as described in connection with 1102 in FIG. 11. The IRS beam component 1440 may be configured to activate, in each iteration of a plurality of iterations, a respective segment of a plurality of segments of an IRS of the node. Each iteration of the plurality of iterations may correspond to one segment of the plurality of segments, e.g., as described in connection with 1002 in FIGS. 11 and 1104 in FIG. 11. The IRS beam component 1440 may be configured to forward, from a first wireless device to a second wireless device or from the second wireless device to the first wireless device, in each iteration of the plurality of iterations, one or more respective reference signals of a plurality of reference signals via the respective segment of the plurality of segments of the IRS corresponding to the iteration, e.g., as described in connection with 1004 in FIGS. 11 and 1106 in FIG. 11. The IRS beam component 1440 may be configured to receive, from the first wireless device, an indication of a second configuration for the node to generate one or more reflected beams toward the first wireless device or the second wireless device, e.g., as described in connection with 1006 in FIGS. 11 and 1108 in FIG. 11. The IRS beam component 1440 may be configured to forward, from the first wireless device to the second wireless device or from the second wireless device to the first wireless device, communications via the IRS based on the second configuration and the one or more reflected beams, e.g., as described in connection with 1008 in FIGS. 11 and 1110 in FIG. 11.

The apparatus may include additional components that perform each of the blocks of the algorithm in the flowcharts of FIGS. 9-11. As such, each block in the flowcharts of FIGS. 9-11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1402 may include a variety of components configured for various functions. In one configuration, the apparatus 1402, and in particular the baseband unit 1404, includes means for activating, in each iteration of a plurality of iterations, a respective segment of a plurality of segments of an IRS of the node. Each iteration of the plurality of iterations may correspond to one segment of the plurality of segments. The apparatus 1402, and in particular the baseband unit 1404, includes means for forwarding, from a first wireless device to a second wireless device or from the second wireless device to the first wireless device, in each iteration of the plurality of iterations, one or more respective reference signals of a plurality of reference signals via the respective segment of the plurality of segments of the IRS corresponding to the iteration. The apparatus 1402, and in particular the baseband unit 1404, includes means for receiving, from the first wireless device, an indication of a second configuration for the node to generate one or more reflected beams toward the first wireless device or the second wireless device. The apparatus 1402, and in particular the baseband unit 1404, includes means for forwarding, from the first wireless device to the second wireless device or from the second wireless device to the first wireless device, communications via the IRS based on the second configuration and the one or more reflected beams In one configuration, the first wireless device may be a first base station or a first UE. The second wireless device may be a second UE when the first wireless device is the first base station. The second wireless device may be a second base station when the first wireless device is the first UE. In one configuration, the apparatus 1402, and in particular the baseband unit 1404, includes means for receiving, from the first wireless device, in each iteration of the plurality of iterations, an indication of a first configuration for the node to activate the respective segment of the plurality of segments of the IRS of the node. The activation of the respective segment may be based on the first configuration. In one configuration, the second configuration may be based on an interpolation process based on a plurality of phases or phase derivatives associated with the plurality of segments. Each of the plurality of phases or phase derivatives may be associated with one point included in a corresponding segment of the plurality of segments. In one configuration, the interpolation process may include one of quadratic interpolation, geometric interpolation, spline interpolation, or higher order polynomial interpolation. In one configuration, the plurality of phases or phase derivatives may be based on a plurality of channel complex gain measurements based on the plurality of reference signals, and each of the plurality of channel complex gain measurements is over one or more OFDM symbols. In one configuration, the forwarding of the one or more respective reference signals may be based on at least one wide beam associated with at least one virtual focal point when the interpolation process is based on the plurality of phase derivatives. Each phase derivative of the plurality of phase derivatives may be associated with two virtual focal points. In one configuration, a number of phases or phase derivatives in the plurality of phases or phase derivatives may be greater than or equal to a number of unknown parameters to be solved in the interpolation process. In one configuration, the interpolation process may yield a phase offset parameter for co-phasing the IRS of the node and one or more other IRSs when the IRS of the node is used in conjunction with the one or more other IRSs. In one configuration, the interpolation process may be associated with a set of equations. An absolute difference between 1 and a ratio between a minimum eigenvalue associated with the set of equations and a maximum eigenvalue associated with the set of equations may be less than a first threshold. In one configuration, the one or more respective reference signals may include one or more SSBs, one or more CSI-RSs, or one or more SRSs. In one configuration, in the plurality of iterations, the forwarding of the one or more respective reference signals may be associated with a same forwarding direction toward a receiving wireless device of the first wireless device and the second wireless device. The one or more reflected beams may be toward the receiving wireless device. In one configuration, a distance between the IRS of the node and the receiving wireless device may be greater than a second threshold.

The means may be one or more of the components of the apparatus 1402 configured to perform the functions recited by the means.

Figure 15:
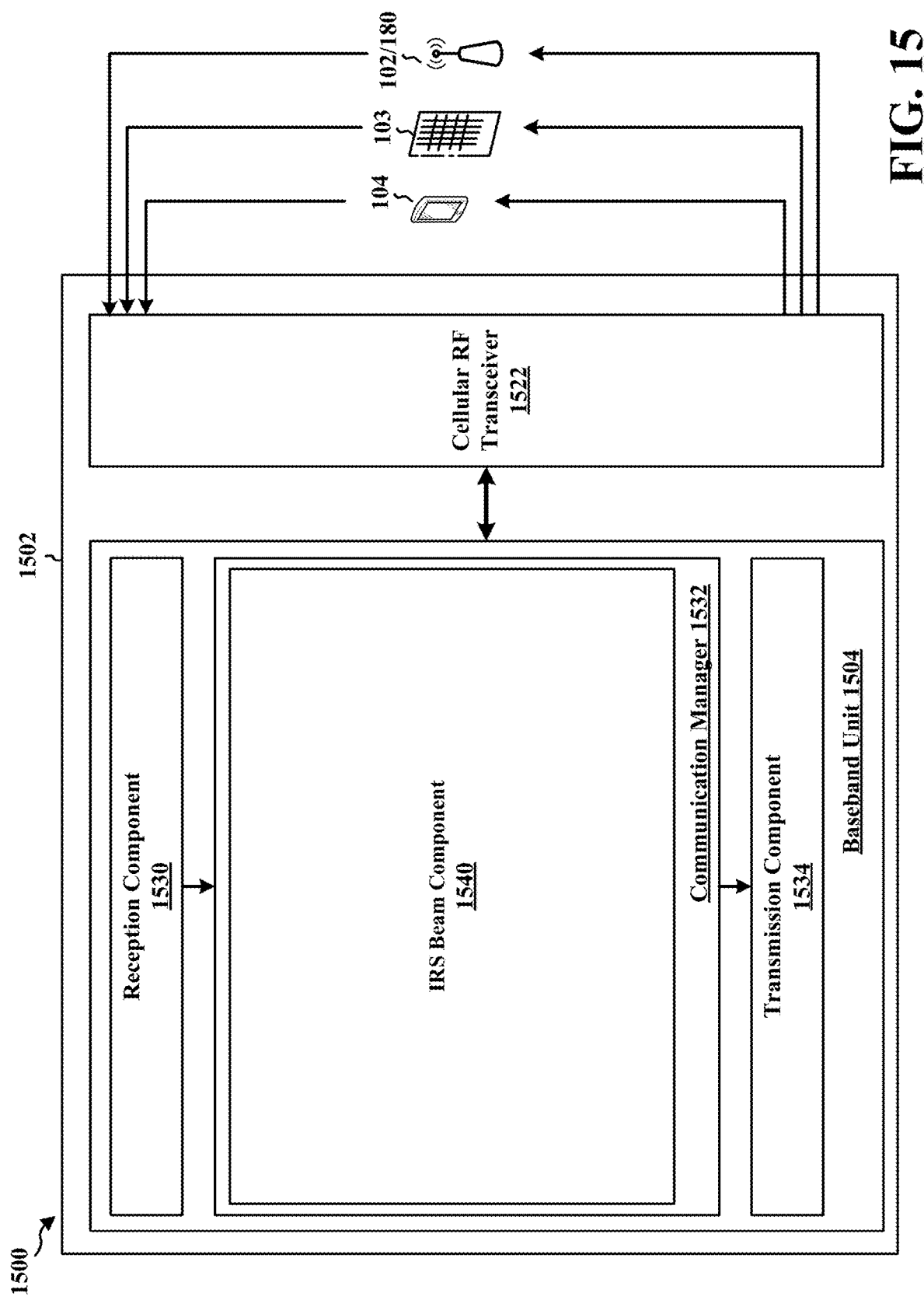
FIG. 15 is a diagram illustrating an example of a hardware implementation for an example apparatus.

FIG. 15 is a diagram 1500 illustrating an example of a hardware implementation for an apparatus 1502. The apparatus 1502 may be a first wireless device, which may be a base station or a UE, a component of a first wireless device, or may implement first wireless device functionality. In some aspects, the apparatus 1502 may include a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. When the first wireless device corresponds to a UE, the cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502. When the first wireless device corresponds to a base station, the baseband unit 1504 may be a component of the base station 310 and may include the memory 376 and/or at least one of the TX processor 316, the RX processor 370, and the controller/processor 375.

The communication manager 1532 may include an IRS beam component 1540 that may be configured to estimate a first surface phase for the node based on at least one wide beam from the node, e.g., as described in connection with 1302 in FIG. 13. The IRS beam component 1540 may be configured to transmit, to a node, in each iteration of a plurality of iterations, an indication of a first configuration for the node associated with activating a respective segment of a plurality of segments of an IRS of the node, e.g., as described in connection with 1304 in FIG. 13. The IRS beam component 1540 may be configured to receive, from the second wireless device, in each iteration of the plurality of iterations, the one or more respective reference signals of the plurality of reference signals via the respective segment corresponding to the iteration, e.g., as described in connection with 1306 in FIG. 13. The IRS beam component 1540 may be configured to measure, in each iteration of the plurality of iterations, one or more respective channel complex gains over one or more OFDM symbols based on the received one or more respective reference signals, e.g., as described in connection with 1308 in FIG. 13. The IRS beam component 1540 may be configured to transmit, to the second wireless device, in each iteration of the plurality of iterations, the one or more respective reference signals of the plurality of reference signals via the respective segment corresponding to the iteration, e.g., as described in connection with 1310 in FIG. 13. The IRS beam component 1540 may be configured to receive, from the second wireless device, in each iteration of the plurality of iterations, one or more respective indications of one or more respective channel complex gain measurements based on the one or more respective reference signals, e.g., as described in connection with 1312 in FIG. 13. The IRS beam component 1540 may be configured to identify, in each iteration of the plurality of iterations, one or more respective phases or phase derivatives of a plurality of phases or phase derivatives based on one or more respective reference signals of a plurality of reference signals, e.g., as described in connection with 1314 in FIG. 13. The IRS beam component 1540 may be configured to identify a second configuration for the node associated with generating one or more reflected beams from the IRS of the node toward the first wireless device or a second wireless device, e.g., as described in connection with 1316 in FIG. 13. The IRS beam component 1540 may be configured to transmit, to the node, an indication of the second configuration for the node associated with generating the one or more reflected beams, e.g., as described in connection with 1318 in FIG. 13. The IRS beam component 1540 may be configured to communicate with the second wireless device via the node based on the second configuration and the one or more reflected beams, e.g., as described in connection with 1320 in FIG. 13.

The apparatus may include additional components that perform each of the blocks of the algorithm in the flowcharts of FIGS. 9, 12, and 13. As such, each block in the flowcharts of FIGS. 9, 12, and 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for transmitting, to a node, in each iteration of a plurality of iterations, an indication of a first configuration for the node associated with activating a respective segment of a plurality of segments of an IRS of the node. Each iteration of the plurality of iterations may correspond to one segment of the plurality of segments. The apparatus 1502, and in particular the baseband unit 1504, includes means for identifying, in each iteration of the plurality of iterations, one or more respective phases or phase derivatives of a plurality of phases or phase derivatives based on one or more respective reference signals of a plurality of reference signals. The one or more respective phases or phase derivatives may be associated with the respective segment. The plurality of phases or phase derivatives may be associated with the plurality of segments. The apparatus 1502, and in particular the baseband unit 1504, includes means for identifying a second configuration for the node associated with generating one or more reflected beams from the IRS of the node toward the first wireless device or a second wireless device. The apparatus 1502, and in particular the baseband unit 1504, includes means for communicating with the second wireless device via the node based on the second configuration and the one or more reflected beams.

In one configuration, the first wireless device may be a first base station or a first UE. The second wireless device may be a second UE when the first wireless device is the first base station. The second wireless device may be a second base station when the first wireless device is the first UE. In one configuration, the apparatus 1502, and in particular the baseband unit 1504, includes means for receiving, from the second wireless device, in each iteration of the plurality of iterations, the one or more respective reference signals of the plurality of reference signals via the respective segment corresponding to the iteration. The apparatus 1502, and in particular the baseband unit 1504, includes means for measuring, in each iteration of the plurality of iterations, one or more respective channel complex gains over one or more OFDM symbols based on the received one or more respective reference signals. The one or more respective phases or phase derivatives may be identified based on the one or more respective channel complex gain measurements. In one configuration, the one or more reflected beams may be toward the first wireless device. In one configuration, a distance between the IRS of the node and the first wireless device may be greater than a second threshold. In one configuration, the apparatus 1502, and in particular the baseband unit 1504, includes means for transmitting, to the second wireless device, in each iteration of the plurality of iterations, the one or more respective reference signals of the plurality of reference signals via the respective segment corresponding to the iteration. The apparatus 1502, and in particular the baseband unit 1504, includes means for receiving, from the second wireless device, in each iteration of the plurality of iterations, one or more respective indications of one or more respective channel complex gain measurements based on the one or more respective reference signals. The one or more respective channel complex gain measurements may be over one or more OFDM symbols. The one or more respective phases or phase derivatives may be identified based on the one or more respective channel complex gain measurements. In one configuration, the one or more reflected beams may be toward the second wireless device. In one configuration, the apparatus 1502, and in particular the baseband unit 1504, includes means for transmitting, to the node, an indication of the second configuration for the node associated with generating the one or more reflected beams. In one configuration, the second configuration may be identified based on an interpolation process based on the plurality of phases or phase derivatives associated with the plurality of segments. In one configuration, the interpolation process may include one of quadratic interpolation, geometric interpolation, spline interpolation, or higher order polynomial interpolation. A number of phases or phase derivatives in the plurality of phases or phase derivatives may be greater than or equal to a number of unknown parameters to be solved in the interpolation process. In one configuration, the respective segment may be associated with at least one wide beam associated with at least one virtual focal point when the interpolation process is based on the plurality of phase derivatives. Each phase derivative of the plurality of phase derivatives may be associated with two virtual focal points. In one configuration, the interpolation process may yield a phase offset parameter associated with co-phasing the IRS of the node and one or more other IRSs when the IRS of the node is used in conjunction with the one or more other IRSs. In one configuration, the interpolation process may be associated with a set of equations. An absolute difference between 1 and a ratio between a minimum eigenvalue associated with the set of equations and a maximum eigenvalue associated with the set of equations is less than a first threshold. In one configuration, the one or more respective reference signals may include one or more SSBs, one or more CSI-RSs, or one or more SRSs. In one configuration, the apparatus 1502, and in particular the baseband unit 1504, includes means for estimating a first surface phase for the node based on at least one wide beam from the node. The at least one wide beam may be associated with at least one virtual focal point. The second configuration for the node may be identified based at least in part on the estimated first surface phase.

The means may be one or more of the components of the apparatus 1502 configured to perform the functions recited by the means. As described supra, when the apparatus 1502 corresponds to a UE, the apparatus 1502 may include the TX Processor 368, the RX Processor 356, and the controller/processor 359. As such, in one configuration, the means may be the TX Processor 368, the RX Processor 356, and the controller/processor 359 configured to perform the functions recited by the means. When the apparatus 1502 corresponds to a base station, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

Referring back to FIGS. 4-13, a node may activate, in each iteration of a plurality of iterations, a respective segment of a plurality of segments of an IRS of the node. Each iteration of the plurality of iterations may correspond to one segment of the plurality of segments. The apparatus may receive, from the first wireless device, an indication of a second configuration for the node to generate one or more reflected beams toward the first wireless device or the second wireless device. The second configuration may be based on an interpolation process based on a plurality of phases or phase derivatives associated with the plurality of segments. The apparatus may forward, from the first wireless device to the second wireless device or from the second wireless device to the first wireless device, communications via the IRS based on the second configuration and the one or more reflected beams. Accordingly, a phase configuration for beamforming from an IRS may be identified based on a sampling and interpolation procedure.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a node including at least one processor coupled to a memory and configured to: activate, in each iteration of a plurality of iterations, a respective segment of a plurality of segments of an IRS of the node, each iteration of the plurality of iterations corresponding to one segment of the plurality of segments; forward, from a first wireless device to a second wireless device or from the second wireless device to the first wireless device, in each iteration of the plurality of iterations, one or more respective reference signals of a plurality of reference signals via the respective segment of the plurality of segments of the IRS corresponding to the iteration; receive, from the first wireless device, an indication of a second configuration for the node to generate one or more reflected beams toward the first wireless device or the second wireless device; and forward, from the first wireless device to the second wireless device or from the second wireless device to the first wireless device, communications via the IRS based on the second configuration and the one or more reflected beams.

Aspect 2 is the apparatus of aspect 1, where the first wireless device is a first base station or a first UE, the second wireless device is a second UE when the first wireless device is the first base station, and the second wireless device is a second base station when the first wireless device is the first UE.

Aspect 3 is the apparatus of any of aspects 1 and 2, the at least one processor being further configured to: receive, from the first wireless device, in each iteration of the plurality of iterations, an indication of a first configuration for the node to activate the respective segment of the plurality of segments of the IRS of the node, where the activation of the respective segment is based on the first configuration.

Aspect 4 is the apparatus of any of aspects 1 to 3, where the second configuration is based on an interpolation process based on a plurality of phases or phase derivatives associated with the plurality of segments, and each of the plurality of phases or phase derivatives is associated with one point included in a corresponding segment of the plurality of segments.

Aspect 5 is the apparatus of aspect 4, where the interpolation process includes one of quadratic interpolation, geometric interpolation, spline interpolation, or higher order polynomial interpolation.

Aspect 6 is the apparatus of any of aspects 4 and 5, where the plurality of phases or phase derivatives are based on a plurality of channel complex gain measurements based on the plurality of reference signals, and each of the plurality of channel complex gain measurements is over one or more OFDM symbols.

Aspect 7 is the apparatus of any of aspects 4 to 6, where the forwarding of the one or more respective reference signals is based on at least one wide beam associated with at least one virtual focal point when the interpolation process is based on the plurality of phase derivatives, and each phase derivative of the plurality of phase derivatives is associated with two virtual focal points.

Aspect 8 is the apparatus of any of aspects 4 to 7, where a number of phases or phase derivatives in the plurality of phases or phase derivatives is greater than or equal to a number of unknown parameters to be solved in the interpolation process.

Aspect 9 is the apparatus of any of aspects 4 to 8, where the interpolation process yields a phase offset parameter for co-phasing the IRS of the node and one or more other IRSs when the IRS of the node is used in conjunction with the one or more other IRSs.

Aspect 10 is the apparatus of any of aspects 4 to 9, where the interpolation process is associated with a set of equations, and an absolute difference between 1 and a ratio between a minimum eigenvalue associated with the set of equations and a maximum eigenvalue associated with the set of equations is less than a first threshold.

Aspect 11 is the apparatus of any of aspects 1 to 10, where the one or more respective reference signals include one or more SSBs, one or more CSI-RSs, or one or more SRSs.

Aspect 12 is the apparatus of any of aspects 1 to 11, where in the plurality of iterations, the forwarding of the one or more respective reference signals is associated with a same forwarding direction toward a receiving wireless device of the first wireless device and the second wireless device, and the one or more reflected beams are toward the receiving wireless device.

Aspect 13 is the apparatus of aspect 12, where a distance between the IRS of the node and the receiving wireless device is greater than a second threshold.

Aspect 14 is the apparatus of any of aspects 1 to 13, further including a transceiver coupled to the at least one processor.

Aspect 15 is an apparatus for wireless communication at a first wireless device including at least one processor coupled to a memory and configured to transmit, to a node, in each iteration of a plurality of iterations, an indication of a first configuration for the node associated with activating a respective segment of a plurality of segments of an IRS of the node, each iteration of the plurality of iterations corresponding to one segment of the plurality of segments; identify, in each iteration of the plurality of iterations, one or more respective phases or phase derivatives of a plurality of phases or phase derivatives based on one or more respective reference signals of a plurality of reference signals, the one or more respective phases or phase derivatives being associated with the respective segment, the plurality of phases or phase derivatives being associated with the plurality of segments; identify a second configuration for the node associated with generating one or more reflected beams from the IRS of the node toward the first wireless device or a second wireless device; and communicate with the second wireless device via the node based on the second configuration and the one or more reflected beams.

Aspect 16 is the apparatus of aspect 16, where the first wireless device is a first base station or a first UE, the second wireless device is a second UE when the first wireless device is the first base station, and the second wireless device is a second base station when the first wireless device is the first UE.

Aspect 17 is the apparatus of any of aspects 15 and 16, the at least one processor being further configured to: receive, from the second wireless device, in each iteration of the plurality of iterations, the one or more respective reference signals of the plurality of reference signals via the respective segment corresponding to the iteration; and measure, in each iteration of the plurality of iterations, one or more respective channel complex gains over one or more OFDM symbols based on the received one or more respective reference signals, where the one or more respective phases or phase derivatives are identified based on the one or more respective channel complex gain measurements.

Aspect 18 is the apparatus of aspect 17, where the one or more reflected beams are toward the first wireless device.

Aspect 19 is the apparatus of any of aspects 17 and 18, where a distance between the IRS of the node and the first wireless device is greater than a second threshold.

Aspect 20 is the apparatus of any of aspects 15 and 16, the at least one processor being further configured to: transmit, to the second wireless device, in each iteration of the plurality of iterations, the one or more respective reference signals of the plurality of reference signals via the respective segment corresponding to the iteration; and receive, from the second wireless device, in each iteration of the plurality of iterations, one or more respective indications of one or more respective channel complex gain measurements based on the one or more respective reference signals, where the one or more respective channel complex gain measurements are over one or more OFDM symbols, and the one or more respective phases or phase derivatives are identified based on the one or more respective channel complex gain measurements.

Aspect 21 is the apparatus of aspect 20, where the one or more reflected beams are toward the second wireless device.

Aspect 22 is the apparatus of any of aspects 15 to 21, the at least one processor being further configured to: transmit, to the node, an indication of the second configuration for the node associated with generating the one or more reflected beams.

Aspect 23 is the apparatus of any of aspects 15 to 22, where the second configuration is identified based on an interpolation process based on the plurality of phases or phase derivatives associated with the plurality of segments.

Aspect 24 is the apparatus of aspect 23, where the interpolation process includes one of quadratic interpolation, geometric interpolation, spline interpolation, or higher order polynomial interpolation, and a number of phases or phase derivatives in the plurality of phases or phase derivatives is greater than or equal to a number of unknown parameters to be solved in the interpolation process.

Aspect 25 is the apparatus of any of aspects 23 and 24, where the respective segment is associated with at least one wide beam associated with at least one virtual focal point when the interpolation process is based on the plurality of phase derivatives, and each phase derivative of the plurality of phase derivatives is associated with two virtual focal points.

Aspect 26 is the apparatus of any of aspects 23 to 25, where the interpolation process yields a phase offset parameter associated with co-phasing the IRS of the node and one or more other IRSs when the IRS of the node is used in conjunction with the one or more other IRSs.

Aspect 27 is the apparatus of any of aspects 23 to 26, where the interpolation process is associated with a set of equations, and an absolute difference between 1 and a ratio between a minimum eigenvalue associated with the set of equations and a maximum eigenvalue associated with the set of equations is less than a first threshold.

Aspect 28 is the apparatus of any of aspects 15 to 27, where the one or more respective reference signals include one or more SSBs, one or more CSI-RSs, or one or more SRSs.

Aspect 29 is the apparatus of any of aspects 15 to 28, the at least one processor being further configured to: estimate a first surface phase for the node based on at least one wide beam from the node, the at least one wide beam being associated with at least one virtual focal point, where the second configuration for the node is identified based at least in part on the estimated first surface phase.

Aspect 30 is the apparatus of any of aspects 15 to 29, further including a transceiver coupled to the at least one processor.

Aspect 31 is a method of wireless communication for implementing any of aspects 1 to 30.

Aspect 32 is an apparatus for wireless communication including means for implementing any of aspects 1 to 30.

Aspect 33 is a computer-readable medium storing computer executable code, where the code when executed by a processor causes the processor to implement any of aspects 1 to 30.

What is claimed is:

1. An apparatus for wireless communication at a node, comprising:
a memory; and
at least one processor coupled to the memory and configured to:
activate, in each iteration of a plurality of iterations, a respective segment of a plurality of segments of an intelligent reflecting surface (IRS) of the node, each iteration of the plurality of iterations corresponding to one segment of the plurality of segments;
forward, from a first wireless device to a second wireless device or from the second wireless device to the first wireless device, in each iteration of the plurality of iterations, one or more respective reference signals of a plurality of reference signals via the respective segment of the plurality of segments of the IRS corresponding to the iteration;
receive, from the first wireless device, an indication of a second configuration for the node to generate one or more reflected beams toward the first wireless device or the second wireless device; and
forward, from the first wireless device to the second wireless device or from the second wireless device to the first wireless device, communications via the IRS based on the second configuration and the one or more reflected beams.

2. The apparatus of claim 1, wherein the first wireless device is a first base station or a first user equipment (UE), the second wireless device is a second UE when the first wireless device is the first base station, and the second wireless device is a second base station when the first wireless device is the first UE.

3. The apparatus of claim 1, the at least one processor being further configured to:
receive, from the first wireless device, in each iteration of the plurality of iterations, an indication of a first configuration for the node to activate the respective segment of the plurality of segments of the IRS of the node, wherein the activation of the respective segment is based on the first configuration.

4. The apparatus of claim 1, wherein the second configuration is based on an interpolation process based on a plurality of phases or phase derivatives associated with the plurality of segments, and each of the plurality of phases or phase derivatives is associated with one point included in a corresponding segment of the plurality of segments.

5. The apparatus of claim 4, wherein the interpolation process includes one of quadratic interpolation, geometric interpolation, spline interpolation, or higher order polynomial interpolation.

6. The apparatus of claim 4, wherein the plurality of phases or phase derivatives are based on a plurality of channel complex gain measurements based on the plurality of reference signals, and each of the plurality of channel complex gain measurements is over one or more orthogonal frequency division multiplexing (OFDM) symbols.

7. The apparatus of claim 4, wherein the forwarding of the one or more respective reference signals is based on at least one wide beam associated with at least one virtual focal point when the interpolation process is based on the plurality of phase derivatives, and each phase derivative of the plurality of phase derivatives is associated with two virtual focal points.

8. The apparatus of claim 4, wherein a number of phases or phase derivatives in the plurality of phases or phase derivatives is greater than or equal to a number of unknown parameters to be solved in the interpolation process.

9. The apparatus of claim 4, wherein the interpolation process yields a phase offset parameter for co-phasing the IRS of the node and one or more other IRSs when the IRS of the node is used in conjunction with the one or more other IRSs.

10. The apparatus of claim 4, wherein the interpolation process is associated with a set of equations, and an absolute difference between 1 and a ratio between a minimum eigenvalue associated with the set of equations and a maximum eigenvalue associated with the set of equations is less than a first threshold.

11. The apparatus of claim 1, wherein the one or more respective reference signals comprise one or more synchronization signal blocks (SSBs), one or more channel state information (CSI)-reference signals (RSs) (CSI-RSs), or one or more sounding reference signals (SRSs).

12. The apparatus of claim 1, wherein in the plurality of iterations, the forwarding of the one or more respective reference signals is associated with a same forwarding direction toward a receiving wireless device of the first wireless device and the second wireless device, and the one or more reflected beams are toward the receiving wireless device.

13. The apparatus of claim 12, further comprising a transceiver coupled to the at least one processor, wherein a distance between the IRS of the node and the receiving wireless device is greater than a second threshold.

14. A method of wireless communication at a node, comprising:
activating, in each iteration of a plurality of iterations, a respective segment of a plurality of segments of an intelligent reflecting surface (IRS) of the node, each iteration of the plurality of iterations corresponding to one segment of the plurality of segments;
forwarding, from a first wireless device to a second wireless device or from the second wireless device to the first wireless device, in each iteration of the plurality of iterations, one or more respective reference signals of a plurality of reference signals via the respective segment of the plurality of segments of the IRS corresponding to the iteration;
receiving, from the first wireless device, an indication of a second configuration for the node to generate one or more reflected beams toward the first wireless device or the second wireless device; and
forwarding, from the first wireless device to the second wireless device or from the second wireless device to the first wireless device, communications via the IRS based on the second configuration and the one or more reflected beams.

15. An apparatus for wireless communication at a first wireless device, comprising:
a memory; and
at least one processor coupled to the memory and configured to:
transmit, to a node, in each iteration of a plurality of iterations, an indication of a first configuration for the node associated with activating a respective segment of a plurality of segments of an intelligent reflecting surface (IRS) of the node, each iteration of the plurality of iterations corresponding to one segment of the plurality of segments;

identify, in each iteration of the plurality of iterations, one or more respective phases or phase derivatives of a plurality of phases or phase derivatives based on one or more respective reference signals of a plurality of reference signals, the one or more respective phases or phase derivatives being associated with the respective segment, the plurality of phases or phase derivatives being associated with the plurality of segments;

identify a second configuration for the node associated with generating one or more reflected beams from the IRS of the node toward the first wireless device or a second wireless device; and communicate with the second wireless device via the node based on the second configuration and the one or more reflected beams.

16. The apparatus of claim 15, wherein the first wireless device is a first base station or a first user equipment (UE), the second wireless device is a second UE when the first wireless device is the first base station, and the second wireless device is a second base station when the first wireless device is the first UE.

17. The apparatus of claim 15, the at least one processor being further configured to:
receive, from the second wireless device, in each iteration of the plurality of iterations, the one or more respective reference signals of the plurality of reference signals via the respective segment corresponding to the iteration; and
measure, in each iteration of the plurality of iterations, one or more respective channel complex gains over one or more orthogonal frequency division multiplexing (OFDM) symbols based on the received one or more respective reference signals, wherein the one or more respective phases or phase derivatives are identified based on the one or more respective channel complex gain measurements.

18. The apparatus of claim 17, wherein the one or more reflected beams are toward the first wireless device.

19. The apparatus of claim 17, wherein a distance between the IRS of the node and the first wireless device is greater than a second threshold.

20. The apparatus of claim 15, the at least one processor being further configured to:
transmit, to the second wireless device, in each iteration of the plurality of iterations, the one or more respective reference signals of the plurality of reference signals via the respective segment corresponding to the iteration; and
receive, from the second wireless device, in each iteration of the plurality of iterations, one or more respective indications of one or more respective channel complex gain measurements based on the one or more respective reference signals, wherein the one or more respective channel complex gain measurements are over one or more orthogonal frequency division multiplexing (OFDM) symbols, and the one or more respective phases or phase derivatives are identified based on the one or more respective channel complex gain measurements.

21. The apparatus of claim 20, wherein the one or more reflected beams are toward the second wireless device.

22. The apparatus of claim 15, the at least one processor being further configured to:
transmit, to the node, an indication of the second configuration for the node associated with generating the one or more reflected beams.

23. The apparatus of claim 15, wherein the second configuration is identified based on an interpolation process based on the plurality of phases or phase derivatives associated with the plurality of segments.

24. The apparatus of claim 23, wherein the interpolation process includes one of quadratic interpolation, geometric interpolation, spline interpolation, or higher order polynomial interpolation, and a number of phases or phase derivatives in the plurality of phases or phase derivatives is greater than or equal to a number of unknown parameters to be solved in the interpolation process.

25. The apparatus of claim 23, wherein the respective segment is associated with at least one wide beam associated with at least one virtual focal point when the interpolation process is based on the plurality of phase derivatives and each phase derivative of the plurality of phase derivatives may be associated with two virtual focal points.

26. The apparatus of claim 23, wherein the interpolation process yields a phase offset parameter associated with co-phasing the IRS of the node and one or more other IRSs when the IRS of the node is used in conjunction with the one or more other IRSs.

27. The apparatus of claim 23, wherein the interpolation process is associated with a set of equations, and an absolute difference between 1 and a ratio between a minimum eigenvalue associated with the set of equations and a maximum eigenvalue associated with the set of equations is less than a first threshold.

28. The apparatus of claim 15, wherein the one or more respective reference signals comprise one or more synchronization signal blocks (SSBs), one or more channel state information (CSI)-reference signals (RSs) (CSI-RSs), or one or more sounding reference signals (SRSs).

29. The apparatus of claim 15, further comprising a transceiver coupled to the at least one processor, the at least one processor being further configured to:
estimate a first surface phase for the node based on at least one wide beam from the node, the at least one wide beam being associated with at least one virtual focal point, wherein the second configuration for the node is identified based at least in part on the estimated first surface phase.

30. A method of wireless communication at a first wireless device, comprising:
transmitting, to a node, in each iteration of a plurality of iterations, an indication of a first configuration for the node associated with activating a respective segment of a plurality of segments of an intelligent reflecting surface (IRS) of the node, each iteration of the plurality of iterations corresponding to one segment of the plurality of segments;
identifying, in each iteration of the plurality of iterations, one or more respective phases or phase derivatives of a plurality of phases or phase derivatives based on one or more respective reference signals of a plurality of reference signals, the one or more respective phases or phase derivatives being associated with the respective segment, the plurality of phases or phase derivatives being associated with the plurality of segments;
identifying a second configuration for the node associated with generating one or more reflected beams from the IRS of the node toward the first wireless device or a second wireless device; and communicating with the second wireless device via the node based on the second configuration and the one or more reflected beams.

\* \* \* \* \*